US012776347B2

(12) United States Patent
Morita et al.

(10) Patent No.: US 12,776,347 B2
(45) Date of Patent: Oct. 27, 2026

(54) DISK DEVICE HAVING ABSORPTION UNIT

(71) Applicants: Kabushiki Kaisha Toshiba, Tokyo (JP); Toshiba Electronic Devices & Storage Corporation, Tokyo (JP)

(72) Inventors: Masaki Morita, Yokohama Kanagawa (JP); Shinji Fujimoto, Yokohama Kanagawa (JP); Yasuhiko Kato, Setagaya Tokyo (JP); Hirofumi Suzuki, Kawasaki Kanagawa (JP); Yuki Sato, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 8 days.

(21) Appl. No.: 18/829,872

(22) Filed: Sep. 10, 2024

(65) Prior Publication Data

US 2025/0246211 A1 Jul. 31, 2025

(30) Foreign Application Priority Data

Jan. 30, 2024 (JP) ................................ 2024-011540

(51) Int. Cl.
*G11B 33/14* (2006.01)
*G11B 5/82* (2006.01)
*G11B 33/02* (2006.01)

(52) U.S. Cl.
CPC ............ *G11B 33/1453* (2013.01); *G11B 5/82* (2013.01); *G11B 33/022* (2013.01)

(58) Field of Classification Search
None
See application file for complete search history.

(56) References Cited

U.S. PATENT DOCUMENTS

| | | | | | |
|---|---|---|---|---|---|
| 4,831,475 | A | * | 5/1989 | Kakuda .............. | G11B 33/1453 |
| 5,075,807 | A | * | 12/1991 | Inoue ................ | G11B 33/1453 360/99.15 |
| 5,293,286 | A | * | 3/1994 | Hasegawa .......... | G11B 33/1453 |
| 5,590,001 | A | * | 12/1996 | Ino ....................... | G11B 25/043 360/97.18 |
| 5,764,435 | A | * | 6/1998 | Sugimoto .......... | G11B 33/1486 360/97.18 |
| 6,008,966 | A | | 12/1999 | Forbord et al. | |

(Continued)

FOREIGN PATENT DOCUMENTS

| | | | |
|---|---|---|---|
| JP | 2003317464 A | * | 11/2003 |
| JP | 5052250 B2 | | 10/2012 |

*Primary Examiner* — William J Klimowicz
(74) *Attorney, Agent, or Firm* — Kim & Stewart LLP

(57) ABSTRACT

A disk device according to an embodiment includes a housing, a holding member, a moisture absorption unit, and an adsorption unit. The housing includes a base with an internal space filled with a first gas, and a cover closing the internal space. The holding member is attached to the base in the internal space. The moisture absorption unit includes a moisture absorbent having a composition to adsorb moisture, and a case attached to the cover in the internal space. The case accommodates the moisture absorbent. The adsorption unit includes an adsorbent having a composition to adsorb a second gas different from the first gas. The adsorption unit is held by at least one of the holding member and the case outside the case in the internal space. The absorption member is exposed to the internal space.

12 Claims, 13 Drawing Sheets

(56) References Cited

U.S. PATENT DOCUMENTS

| | | | | |
|---|---|---|---|---|
| 6,999,273 | B2 * | 2/2006 | Tsang | G11B 25/043 360/97.16 |
| 8,665,555 | B1 * | 3/2014 | Young | G11B 33/1486 360/99.15 |
| 8,760,797 | B1 | 6/2014 | Beatty et al. | |
| 12,456,498 | B2 * | 10/2025 | Zaima | G11B 33/1486 |
| 2003/0227711 | A1 * | 12/2003 | Macpherson | G11B 5/484 360/97.16 |
| 2006/0081128 | A1 * | 4/2006 | Ball | B01J 20/28035 96/121 |
| 2007/0025015 | A1 * | 2/2007 | Suwa | G11B 33/146 |
| 2020/0286527 | A1 * | 9/2020 | Suzuki | G11B 23/045 |
| 2022/0020391 | A1 * | 1/2022 | Sonoda | G11B 5/012 |
| 2022/0028430 | A1 * | 1/2022 | Mizutani | B01D 46/0036 |
| 2022/0375502 | A1 * | 11/2022 | Mizutani | G11B 33/1466 |
| 2024/0096372 | A1 * | 3/2024 | Tokizaki | G11B 33/1466 |
| 2024/0144979 | A1 * | 5/2024 | Sumiya | G11B 33/146 |

* cited by examiner

DISK DEVICE HAVING ABSORPTION UNIT

CROSS-REFERENCE TO RELATED APPLICATIONS

This application is based upon and claims the benefit of priority from Japanese Patent Application No. 2024-011540, filed on Jan. 30, 2024; the entire contents of which are incorporated herein by reference.

FIELD

Embodiments described herein relate generally to a disk device.

BACKGROUND

Disk devices such as a hard disk drive (HDD) generally include, for example, various kinds of components including magnetic disks, magnetic heads, and an adsorbent, and a housing accommodating the components. The adsorbent works to adsorb predetermined gases occurring inside the housing to reduce solidified gases on the magnetic heads, leading to helping the magnetic heads stably float above the magnetic disks.

For example, the adsorbent may be disposed around the magnetic disks to receive airflow arising from the rotation of the magnetic disks. However, only a small space is available for containing the component as the adsorbent around the magnetic disks. Such a small space can accommodate only a small amount of adsorbent. The amount of gas that the small amount of adsorbent can adsorb may be reduced accordingly.

DETAILED DESCRIPTION

A disk device according to an embodiment includes a housing, a holding member, a moisture absorption unit, and an adsorption unit. The housing includes a base with an internal space filled with a first gas, and a cover attached to the base, to close the internal space. The holding member is attached to the base in the internal space and holds a flexible printed circuit board. The moisture absorption unit includes a moisture absorbent having a composition to adsorb moisture, and a case attached to the cover in the internal space. The case accommodates the moisture absorbent. The adsorption unit includes an adsorbent having a composition to adsorb a second gas different from the first gas. The adsorption unit is held by at least one of the holding member and the case outside the case in the internal space. The absorption member is exposed to the internal space.

First Embodiment

A first embodiment will be described below with reference to FIGS. 1 to 3. Note that, in some cases, a plurality of expressions is given for component elements according to the embodiments and for description of the component elements, in the present specification. The component elements and the descriptions thereof are made by way of examples and are not limited to the expressions in the present specification. The component elements can be identified by names different from those in the present specification, as well. In addition, different expressions from those in the present specification can be given for the component elements.

In descriptions below, "suppress" is defined as, for example, preventing occurrence of an event, action, or influence, or reducing the degree of the event, action, or influence. Furthermore, in the following description, "restrict" is defined as, for example, preventing movement or rotation, or permitting the movement or rotation within a predetermined range but preventing the movement or rotation beyond the predetermined range.

Figure 1:
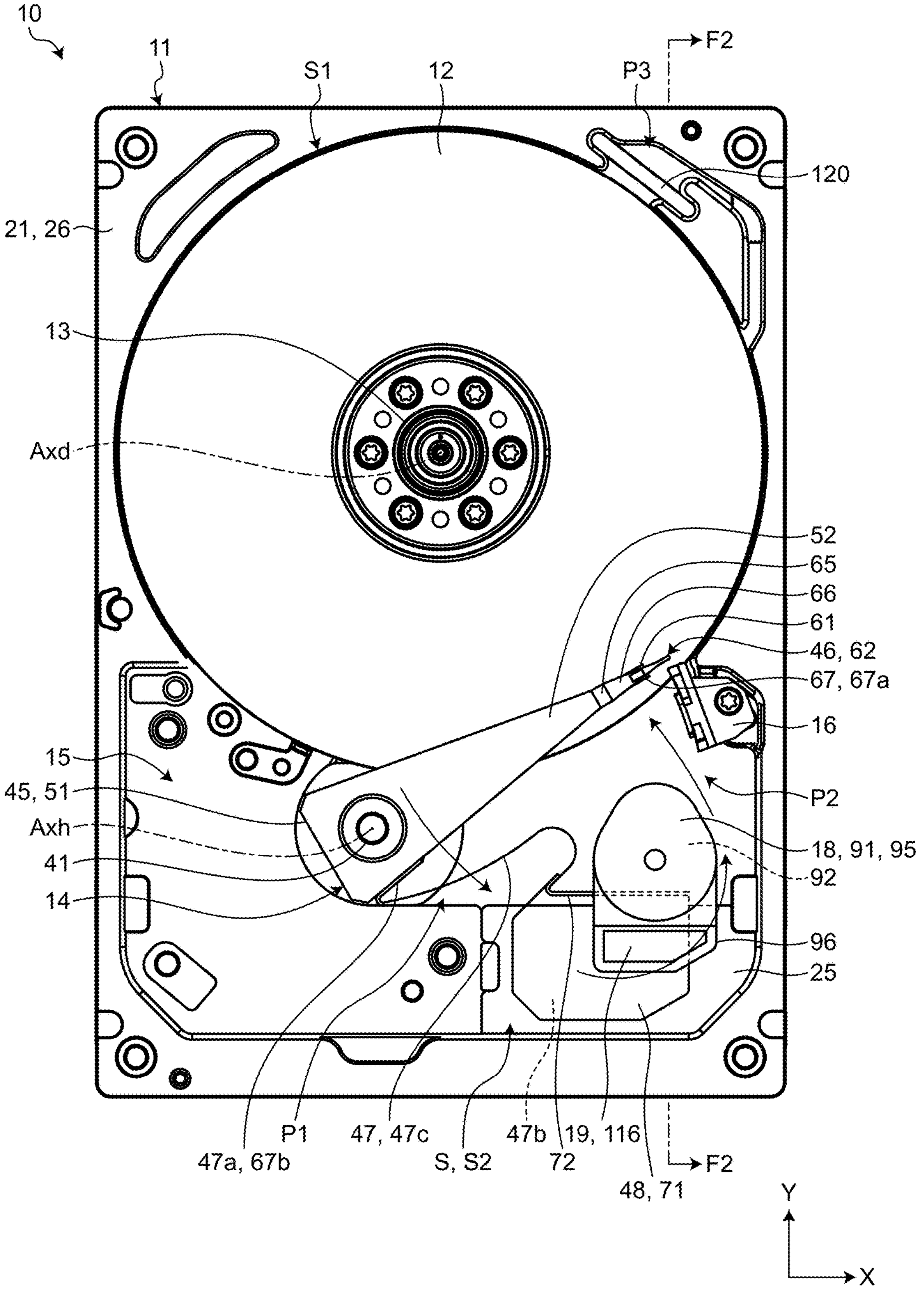
FIG. 1 is an exemplary plan view of an HDD according to a first embodiment.

FIG. 1 is an exemplary plan view of a hard disk drive (HDD) 10 according to a first embodiment. FIG. 2 is an exemplary cross-sectional view schematically illustrating a part of the HDD 10 of the first embodiment taken along line F2-F2 of FIG. 1. The HDD 10 is an example of the disk device and can also be referred to as an electronic device, a storage device, an external storage device, or a magnetic disk device.

As illustrated in the drawings, in the present specification, an X-axis, a Y-axis, and a Z-axis are defined for convenience. The X-axis, the Y-axis, and the Z-axis are orthogonal to each other. The X-axis is provided along the width of the HDD 10. The Y-axis is provided along the length of the HDD 10. The Z-axis is provided along the thickness of the HDD 10.

Furthermore, in the present specification, an X direction, a Y direction, and a Z direction are defined. The X direction is a direction extending along the X-axis, and includes a +X direction that is indicated by an X-axis arrow and a −X direction that is an opposite direction to the direction indicated by the X-axis arrow. The Y direction is a direction extending along the Y-axis, and includes a +Y direction that is indicated by a Y-axis arrow and a −Y direction that is an opposite direction to the direction indicated by the Y-axis arrow. The Z direction is a direction extending along the Z-axis, and includes a +Z direction that is indicated by a Z-axis arrow and a −Z direction that is an opposite direction to the direction indicated by the Z-axis arrow.

Figure 2:
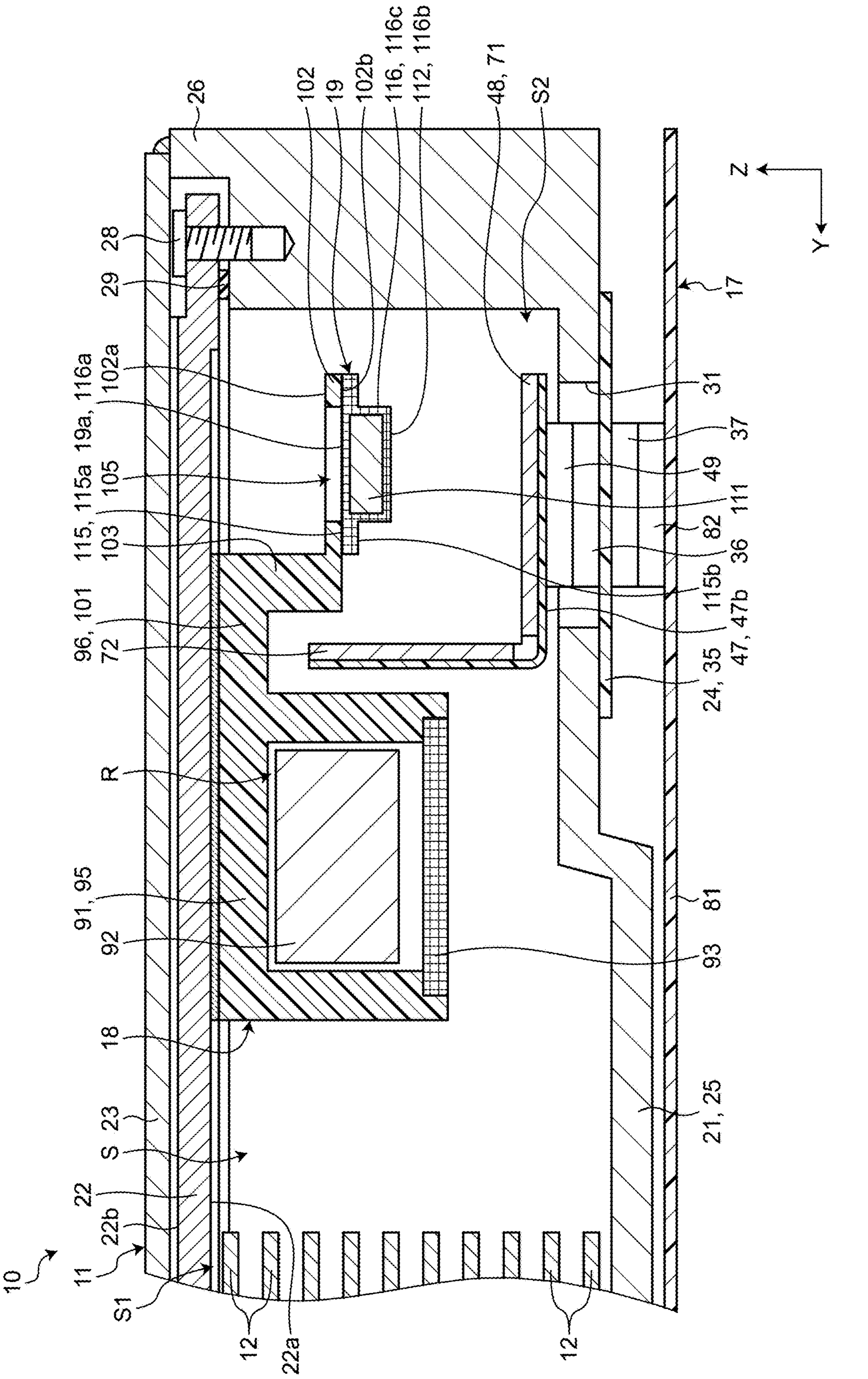
FIG. 2 is an exemplary cross-sectional view schematically illustrating a part of the HDD of the first embodiment taken along line F2-F2 of FIG. 1.

As illustrated in FIGS. 1 and 2, the HDD 10 includes a housing 11, a plurality of magnetic disks 12, a spindle motor 13, a head stack assembly (HSA) 14, a voice coil motor (VCM) 15, a ramp load mechanism 16, a printed circuit board (PCB) 17 (illustrated in FIG. 2), a moisture absorption unit 18, and an adsorption unit 19. Each of the magnetic disks 12 can also be referred to as a disk or a platter.

As illustrated in FIG. 2, the housing 11 includes a base 21, an inner cover 22, an outer cover 23, and a relay board 24. Note that the housing 11 is not limited to this example. In FIG. 1, the inner cover 22 and the outer cover 23 are omitted for convenience. The inner cover 22 is an example of the cover.

As illustrated in FIG. 1, the base 21 has a substantially cuboid box shape opened in the +Z direction. The base 21 includes a bottom wall 25 and a side wall 26. The bottom wall 25 has a substantially rectangular (quadrangular) plate shape extending substantially orthogonally to the Z direction. The side wall 26 protrudes from the edges of the bottom wall 25 substantially in the +Z direction and has a substantially rectangular frame shape.

The base 21 is provided with an internal space S. The internal space S is formed (defined or sectioned) by the bottom wall 25 and the side wall 26. The side wall 26 surrounds the internal space S. The plurality of magnetic disks 12, the spindle motor 13, the HSA 14, the VCM 15, the ramp load mechanism 16, the moisture absorption unit 18, and the adsorption unit 19 are arranged in the internal space S.

As illustrated in FIG. 2, the inner cover 22 is mounted to the base 21. For example, the inner cover 22 is mounted to an end of the side wall 26 in the +Z direction with, for example, a screw 28. Accordingly, the inner cover 22 closes the internal space S.

The inner cover 22 includes an inner surface 22*a* and an outer surface 22*b*. The inner surface 22*a* faces the internal space S, the bottom wall 25, and the end of the side wall 26 in the +Z direction. The outer surface 22*b* is opposite to the inner surface 22*a*.

An endless gasket 29 is interposed between the inner surface 22*a* of the inner cover 22 and the side wall 26. The gasket 29 hermetically seals a space between the inner cover 22 and the side wall 26. The gasket 29 is made of, for example, synthetic rubber having low helium permeability. Note that the gasket 29 may be made of another material.

The outer cover 23 covers the inner cover 22 and is mounted to the base 21. For example, the outer cover 23 is mounted to the end of the side wall 26 in the +Z direction by welding. Therefore, the outer cover 23 hermetically closes the inside of the housing 11 including the internal space S. Note that the outer cover 23 may be omitted.

For example, each of the inner cover 22 and the outer cover 23 is provided with a breather hole. After the components are arranged in the internal space S and the inner cover 22 is mounted to the base 21, air in the internal space S is removed from the breather hole. Furthermore, the internal space S is filled with a gas different from the air, through the breather hole.

The gas filled in the internal space S is, for example, a low-density gas having a density lower than that of the air, an inert gas of low reactivity, or the like. For example, the internal space S is filled with helium. Helium is an example of the first gas. Note that the internal space S may be filled with another fluid.

At least one of the breather hole of the inner cover 22 and the breather hole of the outer cover 23 is hermetically closed by a seal such as an aluminum seal. The seal restricts leakage of the helium from the internal space S to the outside of the housing 11 through the breather hole.

The bottom wall 25 is provided with a through-hole 31. The through-hole 31 penetrates the bottom wall 25 substantially in the Z direction so that the internal space S communicates with the outside. The relay board 24 is mounted to the bottom wall 25 to hermetically close the through-hole 31. The relay board 24 includes a circuit board 35 and two relay connectors 36 and 37.

The circuit board 35 is, for example, a rigid board such as a glass epoxy board. The circuit board 35 covers the through-hole 31 and is mounted to the bottom wall 25. The circuit board 35 hermetically closes the through-hole 31. The two relay connectors 36 and 37 are mounted on both surfaces of the circuit board 35 and are electrically connected to each other.

As illustrated in FIG. 1, each of the plurality of magnetic disks 12 extends orthogonally to the Z direction. The plurality of magnetic disks 12 is arranged at intervals in the Z direction. Each of the magnetic disks 12 is provided with magnetic recording layers on both sides.

The spindle motor 13 supports the plurality of magnetic disks 12. The plurality of magnetic disks 12 is arranged at intervals along a center axis Axd of the magnetic disks 12. The center axis Axd is an imaginary axis extending substantially in the Z direction. The plurality of magnetic disks 12 is held on a hub of the spindle motor 13, for example, by a clamp spring.

The spindle motor 13 integrally rotates the plurality of magnetic disks 12 about the center axis Axd. The center axis Axd is also the center of rotation of the magnetic disks 12 and the spindle motor 13. The center axis Axd is not limited to this example.

The housing 11 further includes a support shaft 41 that is spaced apart from the magnetic disks 12. For example, the support shaft 41 protrudes substantially in the +Z direction, from the bottom wall 25. The HSA 14 is rotatably supported by the support shaft 41.

The HSA 14 is rotatable about a center axis Axh. The center axis Axh is a virtual axis extending substantially in the Z direction. The center axis Axh is, for example, the center of rotation of the HSA 14 and also a center axis of the support shaft 41.

The HSA 14 includes a carriage 45, a plurality of head gimbal assemblies (HGAs) 46, a flexible printed circuit board (FPC) 47, a support plate 48, and a relay connector 49 which is illustrated in FIG. 2. The support plate 48 is an example of the holding member. As illustrated in FIG. 1, the carriage 45 includes an actuator block 51 and a plurality of arms 52.

The actuator block 51 is mounted to the support shaft 41 via a bearing, for example, so as to be rotatable about the center axis Axh. The plurality of arms 52 protrudes from the actuator block 51 substantially in a direction orthogonal to the center axis Axh.

Each of the plurality of HGAs 46 includes a magnetic head 61 and a suspension 62. The magnetic head 61 can also be referred to as a slider. The magnetic head 61 records and reproduces information for a corresponding one of the plurality of magnetic disks 12. In other words, the magnetic head 61 reads and writes information from and on the magnetic disk 12. The suspension 62 is mounted to each of the arms 52, holding the magnetic head 61.

The suspension 62 includes a base plate 65, a loadbeam 66, and a flexure 67. The base plate 65 is mounted to an end of the arm 52. The loadbeam 66 has a plate shape that is thinner than the base plate 65. The loadbeam 66 is mounted to the base plate 65 so as to protrude from the base plate 65.

The flexure 67 is a kind of flexible printed wiring board of an elongated strip shape. The flexure 67 includes, for example, a metal backing plate, an insulating base layer, a conductive layer, and an insulating cover layer.

The flexure 67 extends along the arm 52, the base plate 65, and the loadbeam 66. The flexure 67 has one end 67*a* that is provided with a rotatable gimbal. The magnetic head 61 is mounted on the gimbal of the flexure 67.

The FPC 47 has one end 47*a* that is mounted to the actuator block 51. Each of a plurality of the flexures 67 has the other end 67*b* that is connected to the end 47*a* of the FPC 47. Therefore, the flexure 67 electrically connects the magnetic head 61 and the FPC 47.

The FPC 47 has the other end 47*b* that is mounted to the support plate 48. The support plate 48 is made of, for example, metal or synthetic resin. The support plate 48 has a rigidity that is higher than the rigidity of the FPC 47. The support plate 48 includes a bottom plate 71 and a standing plate 72. The bottom plate 71 is an example of a first wall. The standing plate 72 is an example of a second wall.

The bottom plate 71 is arranged along the bottom wall 25 of the base 21. The bottom plate 71 is separated from the magnetic disks 12 in the substantially-Y direction, for example, and is mounted to the bottom wall 25 with a screw. In other words, the bottom plate 71 is mounted to the base 21 in the internal space S.

The end 47*b* of the FPC 47 is mounted to the bottom plate 71. In other words, the support plate 48 holds the FPC 47. As illustrated in FIG. 2, the relay connector 49 is mounted to the end 47*b*. The bottom plate 71 stiffens the end 47*b* of the FPC 47 on which the relay connector 49 is mounted. The relay connector 49 is connected to the relay connector 36 of the relay board 24.

The standing plate 72 extends substantially in the Z direction from an end of the bottom plate 71 in the +Y direction. In other words, the standing plate 72 extends from the bottom plate 71 toward the inner cover 22. The standing plate 72 holds the FPC 47 so that the width of the FPC 47 has a width that substantially coincides with the Z direction between the two ends 47*a* and 47*b*. The standing plate 72 is arranged, for example, along an X-Z plane. Note that the standing plate 72 is not limited to this example.

As illustrated in FIG. 1, the FPC 47 further includes a flexible part 47*c*. The flexible part 47*c* is provided between the actuator block 51 and the standing plate 72. In other words, the flexible part 47*c* is provided between the two ends 47*a* and 47*b*. The flexible part 47*c* is bent due to elastic deformation, and alleviates the influence of the rotation of the carriage 45. The standing plate 72 supports the end 47*b* connected to the flexible part 47*c*.

The VCM 15 includes a voice coil, a pair of yokes, and magnets provided at the yokes. The voice coil is held in the actuator block 51. The VCM 15 rotates the carriage 45 about the center axis Axh to move the magnetic heads 61 to a desired position.

When the magnetic heads 61 move to the outer edges of the magnetic disks 12 due to the rotation of the HSA 14 by the VCM 15, the ramp load mechanism 16 holds the magnetic heads 61 at positions separated from the magnetic disks 12.

As illustrated in FIG. 2, the PCB 17 is arranged outside the internal space S and mounted to the bottom wall 25. The PCB 17 includes a printed wiring board (PWB) 81 and a relay connector 82. The PWB 81 is, for example, a rigid board such as a glass epoxy board, and includes a multilayer board, a build-up board, or the like.

The relay connector 82 is mounted on the PWB 81. The relay connector 82 is connected to the relay connector 37 of the relay board 24. Thus, the PCB 17 is electrically connected to the magnetic head 61 through the relay board 24, the FPC 47, and the flexure 67.

The PCB 17 further includes various electronic components mounted on the PWB 81, such as an interface (I/F) connector connected to a host computer and a controller controlling the operations of the HDD 10. The controller of the PCB 17 controls the spindle motor 13, the VCM 15, and the magnetic heads 61 through the relay connectors 82, 37, 36, and 49.

The moisture absorption unit 18 includes a case 91, a moisture absorbent 92, and a filter 93. The moisture absorption unit 18 causes the moisture absorbent 92 to adsorb moisture in the internal space S. Note that the moisture absorption unit 18 may have a breather filter that collects a predetermined gas from gases passing through the breather hole of the inner cover 22. The moisture absorption unit 18 is not limited to the above example.

The case 91 is made of, for example, synthetic resin or metal having low helium permeability. The case 91 is attached to the inner surface 22*a* of the inner cover 22 with, for example, a double-sided tape or an adhesive, in the internal space S. The case 91 includes a storage 95 and an attachment wall 96.

The storage 95 has a box shape opened in the −Z direction. The storage 95 has an internal chamber R. The storage 95 stores the moisture absorbent 92 in the chamber R. When the moisture absorption unit 18 has the breather filter, the chamber R communicates with the breather hole of the inner cover 22.

For example, the storage 95 is adjacent to the standing plate 72 of the support plate 48. The storage 95 is separated from the standing plate 72 substantially in the +Y direction. The storage 95 is thus located between the magnetic disks 12 and the standing plate 72. Note that the position of the storage 95 is not limited to this example.

Figure 3:
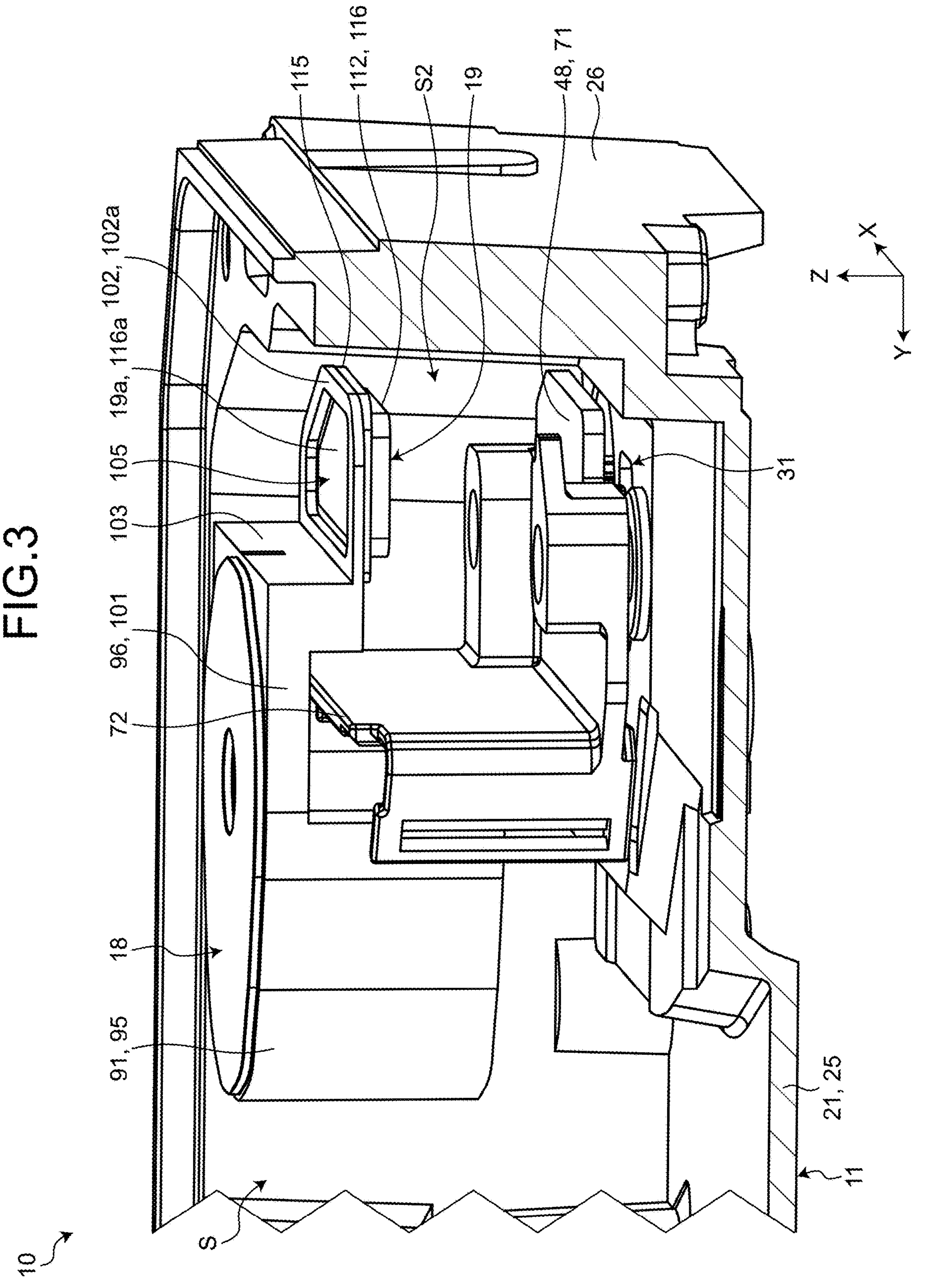
FIG. 3 is an exemplary perspective view of a part of the HDD of the first embodiment.

FIG. 3 is an exemplary perspective view of a part of the HDD 10 of the first embodiment. Note that in the perspective views including FIG. 3, the PCB 17, the inner cover 22, and the outer cover 23 are omitted for convenience. As illustrated in FIG. 3, the attachment wall 96 includes a transverse part 101, an attachment part 102, and an intermediate part 103.

The transverse part 101 extends substantially in the −Y direction from the storage 95. The transverse part 101 extends along the inner surface 22*a* of the inner cover 22 across the standing plate 72 of the support plate 48. In other words, the transverse part 101 has an end in the −Y direction, and the end is separated from the standing plate 72 substantially in the −Y direction. The transverse part 101 is mounted on the inner surface 22*a* of the inner cover 22. Note that the transverse part 101 may be separated from the inner cover 22.

The attachment part 102 is separated from the housing 11 and the storage 95. In other words, the attachment part 102 is separated from the bottom wall 25 of the base 21 in the +Z direction and is separated from the inner cover 22 in the −Z direction. Furthermore, the attachment part 102 is separated from the storage 95 and the standing plate 72 in the −Y direction.

As illustrated in FIG. 2, the attachment part 102 includes an upper surface 102*a* and a lower surface 102*b*. Note that "upper" and "lower" in the present embodiment are terms for convenience, based on the arrangement in FIG. 2, not limiting positions, directions, and usage modes. The upper surface 102*a* is an example of a fourth surface. The lower surface 102*b* is an example of a fifth surface.

The upper surface 102*a* is substantially flat and faces substantially in the +Z direction. The upper surface 102*a* faces the inner surface 22*a* of the inner cover 22 leaving a space. The lower surface 102*b* is opposite to the upper surface 102*a*. The lower surface 102*b* is substantially flat and faces substantially in the −Z direction. The lower surface 102*b* faces the bottom wall 25 of the base 21 leaving a space.

The attachment part 102 is provided with a through-hole 105. The through-hole 105 penetrates the attachment part 102 in substantially the Z direction. Therefore, the through-hole 105 is opened in the upper surface 102*a* and the lower surface 102*b*. Note that the through-hole 105 may be a cutout opened at an edge of the attachment part 102.

The intermediate portion 103 connects the transverse part 101 and the attachment part 102. For example, the intermediate part 103 extends substantially in the Z direction between the end of the transverse part 101 in the −Y direction and an end of the attachment part 102 in the +Y direction.

The moisture absorbent 92 is, for example, silica gel. Therefore, the moisture absorbent 92 adsorbs moisture. The moisture absorbent 92 may be another substance such as activated carbon, quicklime (CaO), or a molecular sieve.

The filter 93 is, for example, a membrane filter. The filter 93 is attached to an end of the storage 95 in the −Z direction. Therefore, the filter 93 closes the chamber R so that the gas can pass therethrough.

The adsorption unit 19 includes an adsorbent 111 and a film 112. Note that the adsorption unit 19 is not limited to this example. For example, the film 112 can also be referred to as a container. The adsorption unit 19 causes the adsorbent 111 to adsorb a predetermined gas in the internal space S.

The adsorbent 111 is, for example, a gas collector such as activated carbon. The adsorbent 111 adsorbs various organic substances including the gas. The gas (organic gas) adsorbed by the activated carbon is an example of the second gas, and is different from helium filled in the internal space S. The activated carbon as the adsorbent 111 may further adsorb moisture.

The film 112 is made of an air permeable film capable of holding the adsorbent 111. In other words, the film 112 restricts the adsorbent 111 from passing therethrough. The film 112 includes a plate 115 and an embracing part 116. The embracing part 116 is an example of a protrusion.

The plate 115 is a part of the film 112 formed of, for example, a plurality of stacked films or a thick film. Note that the plate 115 is not limited to this example. The plate 115 includes an upper surface 115*a* and a lower surface 115*b*. The lower surface 115*b* is an example of a third surface.

The upper surface 115*a* is substantially flat and faces substantially in the +Z direction. The upper surface 115*a* is attached to the lower surface 102*b* of the attachment part 102 with, for example, a double-sided tape or an adhesive. The upper surface 115*a* surrounds the through-hole 105 opened in the lower surface 102*b* of the attachment part 102. The lower surface 115*b* is opposite to the upper surface 115*a*. The lower surface 115*b* is substantially flat and faces substantially in the −Z direction.

The embracing part 116 is made of a film thinner than the plate 115. The embracing part 116 covers the adsorbent 111. In the present embodiment, the embracing part 116 wraps the adsorbent 111 into substantially a rectangular parallelepiped shape. Note that the shapes of the adsorbent 111 and the embracing part 116 are not limited to this example.

The embracing part 116 protrudes substantially in the −Z direction, from the lower surface 115*b* of the plate 115. Therefore, when the plate 115 is mounted on the lower surface 102*b* of the attachment part 102, the embracing part 116 protrudes from the lower surface 102*b*. The embracing part 116 includes an upper surface 116*a*, a lower surface 116*b*, and a side surface 116*c*. The lower surface 116*b* is an example of a second surface.

The upper surface 116*a* is substantially flat and faces substantially in the +Z direction. The upper surface 116*a* of the embracing part 116 and the upper surface 115*a* of the plate 115 are on substantially the same plane and continued to each other. Therefore, the adsorption unit 19 of the present embodiment has an integrated upper surface 19*a*. The upper surface 19*a* is an example of a first surface.

The upper surface 19*a* includes the upper surfaces 115*a* and 116*a* continued to each other. Therefore, the lower surface 115*b* of the plate 115 is opposite to the upper surface 19*a* (upper surface 115*a*). Furthermore, the upper surface 19*a* (upper surface 115*a*) is mounted on the lower surface 102*b* of the attachment part 102. Therefore, the adsorption unit 19 are allowed to be mounted to the case 91 of the moisture absorption unit 18, after the moisture absorption unit 18 is mounted to the inner cover 22 and immediately before the inner cover 22 is mounted to the base 21.

Unlike the moisture absorbent 92, the adsorption unit 19 is held by the case 91 outside the case 91 in the internal space S. In the present embodiment, the adsorption unit 19 is attached to the case 91 of the moisture absorption unit 18. The adsorption unit 19 may be held by the support plate 48.

The lower surface 116*b* of the embracing part 116 is opposite to the upper surface 116*a* (upper surface 19*a*). The lower surface 116*b* of the embracing part 116 is further away from the attachment part 102 in the −Z direction than the lower surface 115*b* of the plate 115. The side surface 116*c* extends substantially in the Z direction between the lower surface 116*b* of the embracing part 116 and the lower surface 115*b* of the plate 115.

Of the upper surface 19*a*, the upper surface 116*a* of the embracing part 116 is exposed to the internal space S through the through-hole 105. The lower surface 116*b* and the side surface 116*c* of the embracing part 116 are exposed to the internal space S. The upper surface 116*a*, the lower surface 116*b*, and the side surface 116*c* are not entirely in contact with another member, and are not stored in another member in the internal space S. In other words, the adsorption unit 19 is exposed to the internal space S. Note that the upper surface 116*a*, the lower surface 116*b*, and the side surface 116*c* may partially or temporarily make contact with another component.

The adsorption unit 19 and the attachment part 102 overlap the bottom plate 71 of the support plate 48 at least partially in the Z direction. In other words, the adsorption unit 19 and the attachment part 102 at least partially cover the bottom plate 71 in the Z direction. In still other words, the adsorption unit 19 is separated from the magnetic disks 12 and is arranged in the vicinity of the support plate 48. Note that the adsorption unit 19 may be arranged in the vicinity of the support plate 48 so as to be separated from the support plate 48 and the case 91.

The adsorbent 111 adsorbs the organic gas through the upper surface 116*a*, the lower surface 116*b*, and the side surface 116*c*. In other words, the upper surface 116*a* (upper surface 19*a*), the lower surface 116*b*, and the side surface 116*c* through which the organic gas passes are included in the film 112 having air permeability. Furthermore, the lower surface 116*b* and the side surface 116*c* are included in the embracing part 116 protruding from the lower surface 115*b* of the plate 115, of the film 112.

The adsorption unit 19 is attached to the attachment part 102, therefore, the adsorption unit 19 is further apart from the magnetic disks 12 than the moisture absorbent 92 and the storage 95. Furthermore, the adsorption unit 19 is further apart from the magnetic disks 12 than the standing plate 72 of the support plate 48.

As illustrated in FIG. 1, the internal space S includes, for example, a first space S1, a second space S2, a first passage P1, a second passage P2, and a third passage P3. The first space S1, the second space S2, the first passage P1, and the second passage P2 are defined by, for example, the side wall 26 of the housing 11, the VCM 15, the storage 95 of the adsorption unit 19, and the standing plate 72 of the support plate 48. Note that the sections of the internal space S are not limited to this example.

The first space S1 is a part of the internal space S where the plurality of magnetic disks 12 and the spindle motor 13 are arranged. The second space S2 is another part of the internal space S where the adsorption unit 19, the bottom plate 71 of the support plate 48, and the attachment part 102 of the case 91 are arranged.

The standing plate 72 and the storage 95 are positioned between the first space S1 and the second space S2. In other words, the standing plate 72 and the storage 95 separate the first space S1 and the second space S2 from each other. Between the bottom wall 25 of the base 21 and the storage 95 and between the standing plate 72 and the case 91, a gap that makes the first space S1 communicate with the second space S2 is provided.

The first passage P1 and the second passage P2 each make the first space S1 communicate with the second space S2. The second passage P2 is separated from the first passage P1 in the +X direction. The first passage P1 is provided, for example, between the VCM 15 and the storage 95. For example, the actuator block 51 is arranged in the first passage P1. The second passage P2 is provided between the side wall 26 and the storage 95. For example, the ramp load mechanism 16 is arranged in the second passage P2.

The third passage P3 is provided on the side wall 26 around the first space S1. The third passage P3 has both ends that are connected to the first space S1. The HDD 10 further includes an adsorption filter 120 arranged in the third passage P3. Similarly to the adsorbent 111, the adsorption filter 120 adsorbs the organic gas.

Almost the entire area of the first space S1 is occupied by the plurality of magnetic disks 12. Around the first space S1, the side wall 26 extends along the outer periphery of the magnetic disks 12 and serves as a shroud to suppress generation of turbulence. Therefore, it is difficult to arrange other components different from the magnetic disks 12 and the spindle motor 13 in the first space S1.

Around the first space S1, the third passage P3 is provided in the side wall 26, and the adsorption filter 120 is arranged in the third passage P3. However, when the magnetic disks 12 are set to have a larger diameter due to increase in the storage capacity of the HDD 10, the side wall 26 is reduced in thickness, and the third passage P3 is also reduced in size. Therefore, the adsorption filter 120 in the third passage P3 is relatively small.

Rotation of the HSA 14 moves the HGAs 46, the flexible part 47*c* of the FPC 47, and the arms 52 in the first passage P1 and the second passage P2. In the first passage P1 and the second passage P2, a space that does not interfere with the rotating HSA 14 is small. Therefore, it is difficult to arrange the other components in the first passage P1 and the second passage P2.

Meanwhile, the second space S2 is separated from the magnetic disks 12 and the HSA 14. For this reason, components arranged in the second space S2 hardly affect aerodynamic characteristics around the magnetic disks 12 and hardly interfere with the rotating HSA 14. Therefore, in the second space S2, a space in which the components are allowed to be arranged is relatively large.

When the magnetic disks 12 rotate in the internal space S, an airflow is generated. Part of the airflow generated by the rotation of the magnetic disks 12 passes through the third passage P3. The adsorption filter 120 adsorbs and collects the organic gas from the airflow.

Meanwhile, as indicated by arrows in FIG. 1, other part of the airflow generated by the rotation of the magnetic disks 12 flows into the second space S2 from the first space S1 through the first passage P1. In other words, helium flows relatively quickly in the second space S2 where the adsorption unit 19 is arranged.

In the second space S2, the adsorption unit 19 is exposed for exposure to the airflow. The adsorbent 111 of the adsorption unit 19 efficiently adsorbs and collects the organic gas from the airflow, through the upper surface 116*a*, the lower surface 116*b*, and the side surface 116*c* that are exposed to the airflow.

The airflow having passed through the second space S2 returns to the first space S1 through the second passage P2. In other words, the rotating magnetic disks 12 generate an airflow circulating through the first space S1, the first passage P1, the second space S2, and the second passage P2. The adsorption unit 19 removes the organic gas from the circulating airflow.

Meanwhile, when the magnetic disks 12 are stopped, helium in the internal space S substantially stops. However, the second space S2 is relatively large, and therefore, the size and surface area of the adsorbent 111 are allowed to be set larger. Therefore, even in almost stopped helium, the adsorbent 111 adsorbs the organic gas more.

In the HDD 10 according to the first embodiment described above, the housing 11 includes the base 21 with the internal space S, and the inner cover 22 attached to the base 21 to close the internal space S. The internal space S is filled with helium. The support plate 48 is attached to the base 21 in the internal space S to hold the FPC 47. The moisture absorption unit 18 includes the moisture absorbent 92 and the case 91. The case 91 accommodates the moisture absorbent 92 and is attached to the inner cover 22 in the internal space S. The adsorption unit 19 includes the adsorbent 111 having a composition to adsorb the organic gas different from helium. The adsorption unit 19 is held by at least one of the support plate 48 and the case 91 outside the case 91 in the internal space S so as to be exposed to the internal space S.

Only a small space is typically available for accommodating various components in the vicinity of the magnetic disks 12 and the carriage 45. The magnetic disks 12 are adjacent to the side wall 26 of the base 21, so that in the case of installing the magnetic disks 12 of a larger diameter for a larger storage capacity, the side wall 26 of the base 21 is to be decreased in thickness. This further reduces the available space (third passage P3) inside the side wall 26 of the base 21. The carriage 45 rotates the arms 52 and the HGAs 46 and deforms the FPC 47 along with the rotation. Because of this, only a small free space is available outside the movement range of the arms 52, the HGAs 46, and the FPC

47. Meanwhile, in the vicinity of the support plate 48 and the case 91 a relatively large space is available for accommodation of the components. The adsorption unit 19 is disposed in the vicinity of at least one of the support plate 48 and the case 91. This makes it possible to increase the size of the adsorption unit 19, leading to increasing the surface area of the adsorbent 111. Furthermore, the airflow occurring from the rotation of the magnetic disks 12 generally passes through the space (second space S2) in the vicinity of the support plate 48 and the case 91. Thus, the adsorption unit 19 can be efficiently exposed to the airflow. As such, according to the HDD 10 of the present embodiment, the adsorbent 111 can adsorb a larger amount of organic gas, thereby reducing the occurrence of an event that the organic gas disturbs stable floating of the magnetic head 61. Further, due to stable floating of the magnetic head 61, the HDD 10 can be increased in storage capacity.

Some conventional HDDs may include a moisture absorption unit and a support plate, as with the HDD 10. The HDD 10 of the present embodiment, however, allows the adsorption unit 19 to be held by at least one of the case 91 of the moisture absorption unit 18 and the support plate 48. This configuration leads to avoiding an increase in the number of components of the HDD 10, thereby avoiding cost increase.

The magnetic disks 12 are rotatably arranged in the internal space S. The adsorption unit 19 is further apart from the magnetic disks 12 than the moisture absorbent 92. As described above, there is no sufficient spaces to accommodate the components in the vicinity of the magnetic disks 12 and in the vicinity of the arms 52 of the carriage 45 that move along the magnetic disks 12. The moisture absorption unit 18 serves to separate the adsorption unit 19 from the magnetic disks 12 and the arms 52 of the carriage 45. The adsorption unit 19 can thus be disposed in a relatively large space apart from the magnetic disks 12 and the arms 52 of the carriage 45, and can be increased in size accordingly.

The support plate 48 includes the bottom plate 71 attached to the case 91 and the standing plate 72 extending from the bottom plate 71 toward the inner cover 22. The adsorption unit 19 is located further apart from the magnetic disks 12 than the standing plate 72. This creates a space (second space S2) larger than at least the bottom plate 71, to accommodate components between the standing plate 72 and the side wall 26 of the base 21. Thus, the adsorption unit 19 can be disposed in this relatively large space and can be enlarged in size accordingly.

The internal space S includes the first space S1, the second space S2, the first passage P1, and the second passage P2. The magnetic disks 12 are arranged in the first space S1. The adsorption unit 19 is disposed in the second space S2. The first passage P1 allows the first space S1 to communicate with the second space S2. The second passage P2 is apart from the first passage P1 and allows the first space S1 to communicate with the second space S2. The airflow, when generated by the magnetic disks 12 in the first space S1, can circulate through the first passage P1, the second space S2, and the second passage P2. In this manner, being disposed in the second space S2, the adsorption unit 19 can be efficiently exposed to the airflow.

The adsorption unit 19 includes the upper surface 19*a* and the lower surface 116*b* both exposed to the internal space S. The lower surface 116*b* is opposite to the upper surface 19*a*. The adsorbent 111 can adsorb the organic gas through the upper surface 19*a* and through the lower surface 116*b*. Owing to such a configuration, the surfaces of the adsorption unit 19 through which the organic gas passes can be increased in area, allowing the adsorbent 111 to adsorb a larger amount of the organic gas.

The adsorption unit 19 includes the air-permeable film 112 that covers the adsorbent 111. The upper surface 19*a* and the lower surface 116*b* are included in the film 112. This configuration can facilitate the manufacture of the adsorption unit 19.

The adsorption unit 19 is attached to the case 91. Thus, the adsorption unit 19 can be attached to the case 91 outside the internal space S before the inner cover 22 is attached to the base 21. This can facilitate the assembly of the HDD 10.

The case 91 includes the storage 95 that stores the moisture absorbent 92, and the attachment wall 96 with the through-hole 105, extending from the storage 95. The adsorption unit 19 includes the lower surface 115*b* opposite to the upper surface 19*a*, and the embracing part 116 that protrudes from the lower surface 115*b*. The upper surface 19*a* is attached to the attachment wall 96 and exposed to the internal space S through the through-hole 105. The lower surface 116*b* is included in the embracing part 116. Owing to such a configuration, the surfaces of the adsorption unit 19 through which the organic gas passes can be increased in area, allowing the adsorbent 111 to adsorb a larger amount of the organic gas.

Second Embodiment

Hereinafter, a second embodiment will be described with reference to FIGS. 4 and 5. Note that in the following descriptions of a plurality of embodiments, component elements having functions similar to those of the component elements having been described are denoted by the same reference numerals as those of the component elements having been descried above, and the description thereof may be omitted. In addition, a plurality of the component elements denoted by the same reference numerals does not necessarily have all the functions and properties in common, and may have different functions and properties according to the embodiments.

Figure 4:
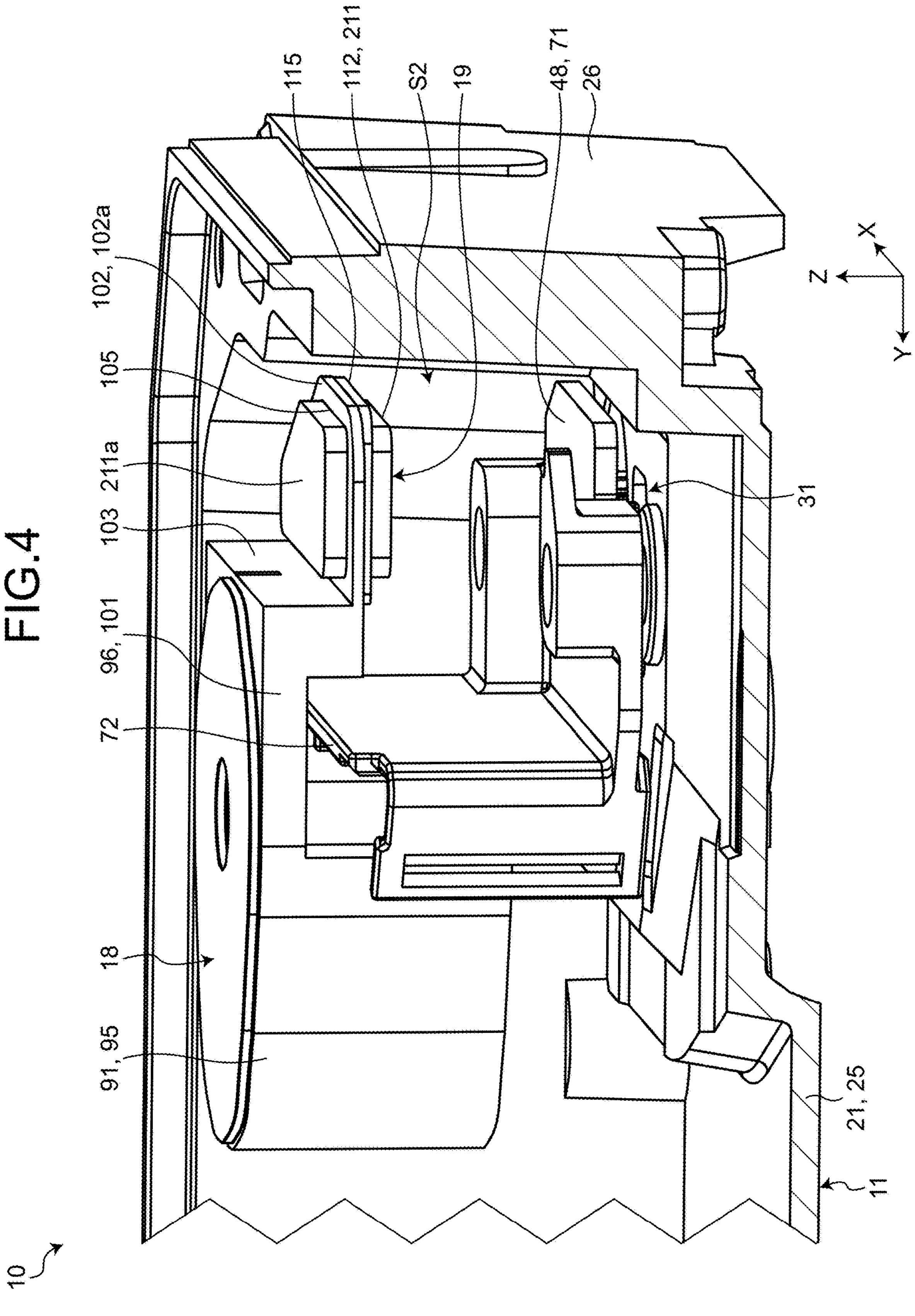
FIG. 4 is an exemplary perspective view of a part of an HDD according to a second embodiment.
Figure 5:
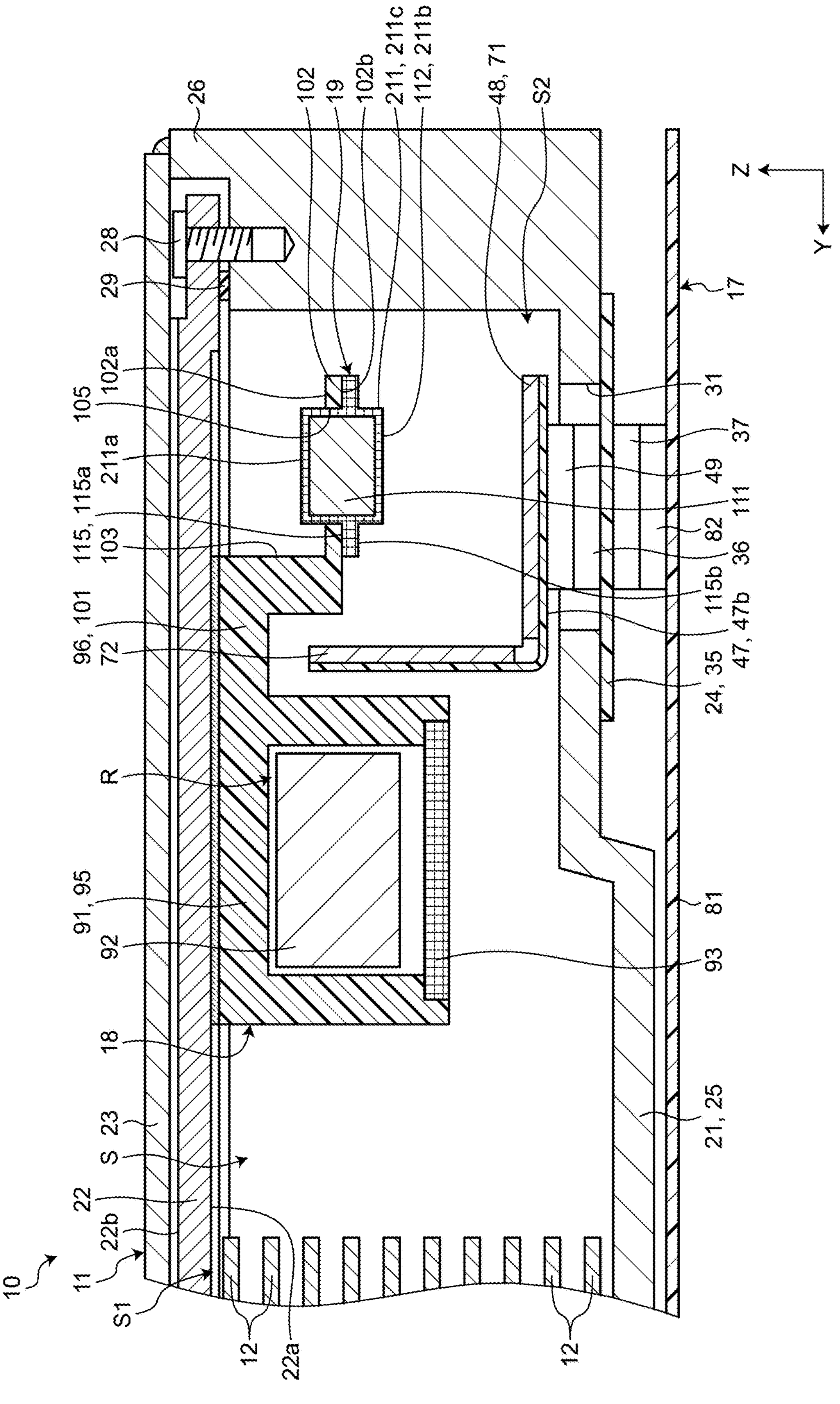
FIG. 5 is an exemplary cross-sectional view schematically illustrating a part of the HDD of the second embodiment.

FIG. 4 is an exemplary perspective view of a part of the HDD 10 according to the second embodiment. FIG. 5 is an exemplary cross-sectional view schematically illustrating a part of the HDD 10 of the second embodiment. As illustrated in FIG. 5, the film 112 of the second embodiment includes an embracing part 211 instead of the embracing part 116. The embracing part 211 is substantially equal to the embracing part 116 except for the points described below.

The embracing part 211 protrudes not only from the lower surface 115*b* of the plate 115 but also from the upper surface 115*a*. The embracing part 211 penetrates the through-hole 105 so as to protrude from the upper surface 102*a* of the attachment part 102. In other words, the embracing part 211 is fitted in the through-hole 105. In addition, the embracing part 211 protrudes from the lower surface 102*b* as in the first embodiment.

The embracing part 211 has an upper surface 211*a* that is exposed to the internal space S at a position separated from the upper surface 102*a* of the attachment part 102 substantially in the +Z direction. The embracing part 211 has a lower surface 211*b* that is exposed to the internal space S at a position separated from the lower surface 102*b* of the attachment part 102 substantially in the −Z direction. The embracing part 211 has a side surface 211*c* that is exposed to the internal space S at a position closer to the inner cover 22 than the attachment part 102 and at a position closer to the bottom wall 25 of the base 21 than the attachment part 102.

In the HDD 10 of the second embodiment described above, the case 91 includes the storage 95 that stores the moisture absorbent 92, and the attachment wall 96 extending from the storage 95. The attachment wall 96 includes the upper surface 102*a* and the lower surface 102*b* opposite to the upper surface 102*a*. The attachment wall 96 is provided with a through-hole 105 opening to the upper surface 102*a* and the lower surface 102*b*. The adsorption unit 19 is fitted in the through-hole 105 so as to protrude from the upper surface 102*a* and from the lower surface 102*b*. In this manner, the surfaces of the adsorption unit 19 through which the organic gas passes can be increased in area, allowing the adsorbent 111 to adsorb a larger amount of the organic gas.

Third Embodiment

Figure 6:
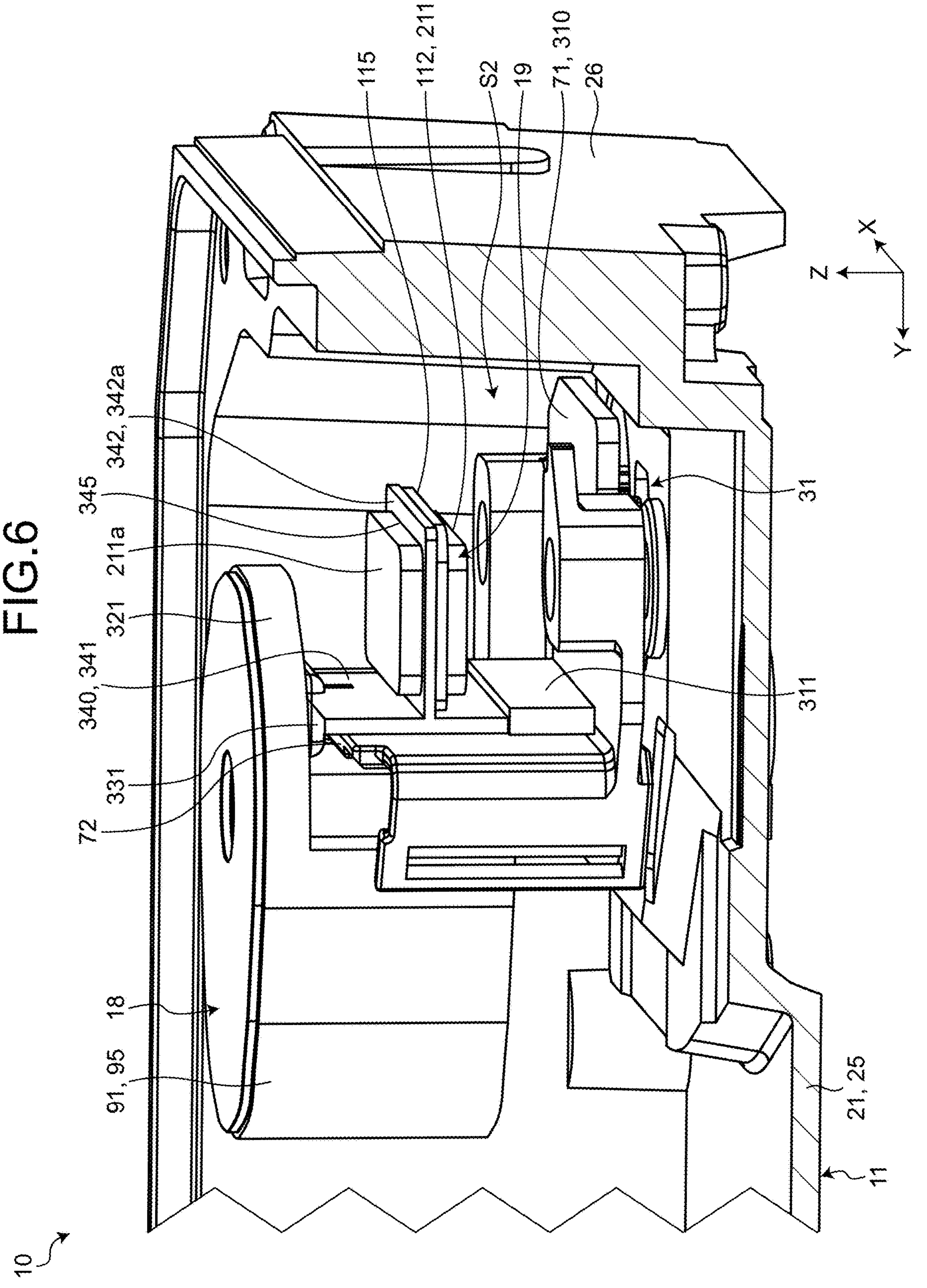
FIG. 6 is an exemplary perspective view of a part of an HDD according to a third embodiment.
Figure 7:
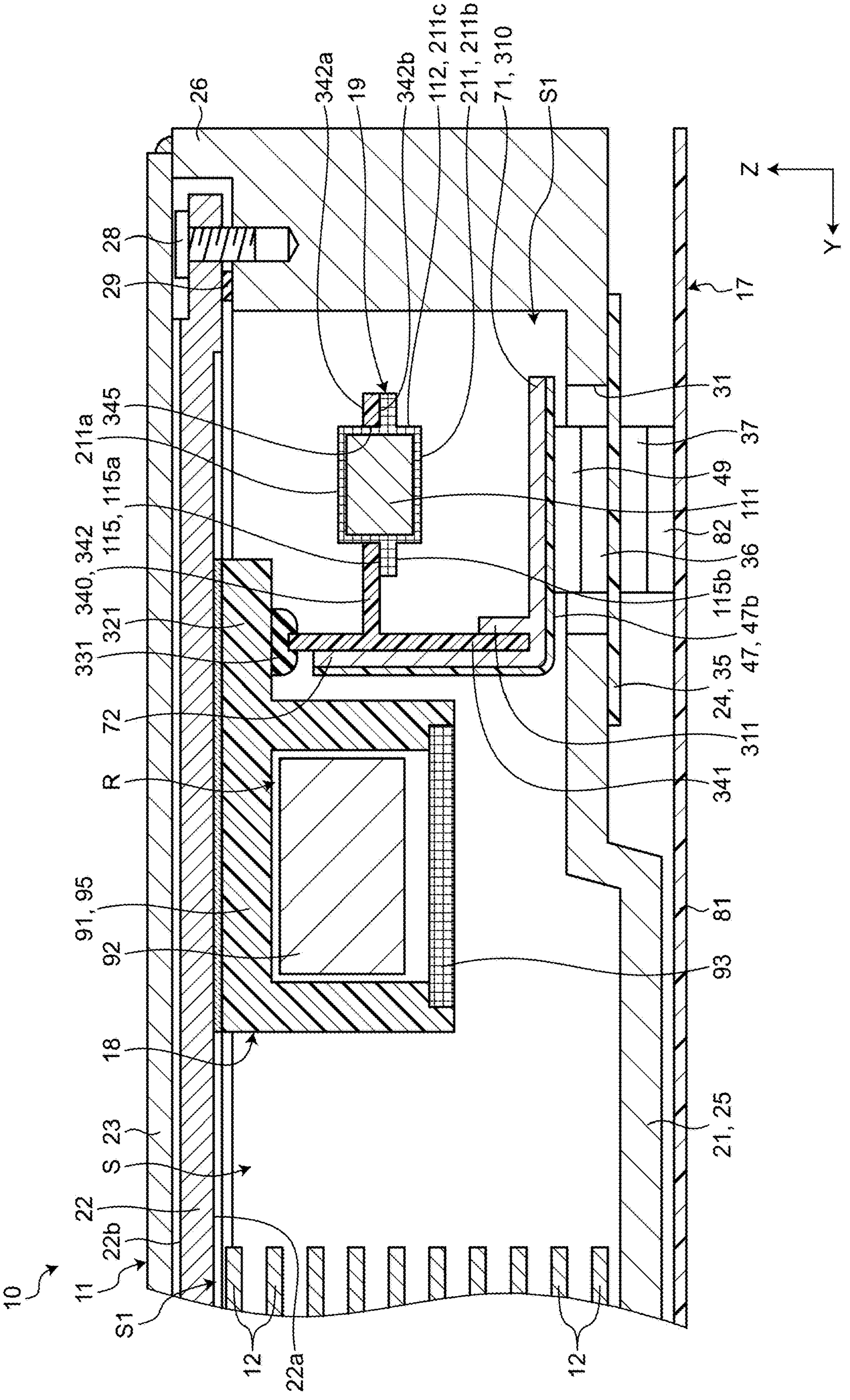
FIG. 7 is an exemplary cross-sectional view schematically illustrating a part of the HDD of the third embodiment.

Hereinafter, a third embodiment will be described with reference to FIGS. 6 and 7. FIG. 6 is an exemplary perspective view of a part of the HDD 10 according to the third embodiment. FIG. 7 is an exemplary cross-sectional view schematically illustrating a part of the HDD 10 of the third embodiment.

As illustrated in FIG. 6, the HSA 14 of the third embodiment includes a support plate 310 instead of the support plate 48. The support plate 310 is substantially equal to the support plate 48 except for the points described below. The support plate 310 includes a holding plate 311. The holding plate 311 protrudes substantially in the +Z direction from the bottom plate 71, in the vicinity of the standing plate 72.

The case 91 of the third embodiment has an attachment wall 321 instead of the attachment wall 96. The attachment wall 321 extends substantially in the −Y direction from the storage 95. The attachment wall 321 extends along the inner surface 22*a* of the inner cover 22, over the standing plate 72 of the support plate 310.

The HDD 10 of the third embodiment further includes an elastic member 331. The elastic member 331 is made of, for example, synthetic rubber. The elastic member 331 is mounted on the attachment wall 321 of the case 91 at a position separated from the standing plate 72 substantially in the −Y direction. The elastic member 331 is positioned between the support plate 310 and the attachment wall 321. Note that the elastic member 331 may be mounted on the bottom plate 71 of the support plate 310.

The adsorption unit 19 of the third embodiment further includes an attachment member 340. The attachment member 340 is an example of a member. The attachment member 340 is made of, for example, synthetic resin or metal. The attachment member 340 includes an intervening part 341 and an attachment part 342.

The intervening part 341 extends substantially in the Z direction. The intervening part 341 has an end in the −Z direction, and the end is held between the standing plate 72 and the holding plate 311 of the support plate 310. The intervening part 341 has an end in the +Z direction, and the end presses the elastic member 331 and is held by the elastic member 331 elastically deformed. In other words, the intervening portion 341 of the attachment member 340 is held between the support plate 310 and the elastic member 331.

The attachment part 342 protrudes substantially in the −Y direction from the intervening part 341. The attachment part 342 is separated from the housing 11 and the storage 95. The attachment part 342 includes an upper surface 342*a* and a lower surface 342*b*.

The upper surface 342*a* is substantially flat and faces substantially in the +Z direction. The upper surface 342*a* faces the inner surface 22*a* of the inner cover 22 leaving a space. The lower surface 342*b* is opposite to the upper surface 342*a*. The lower surface 342*b* is substantially flat and faces substantially in the −Z direction. The lower surface 342*b* faces the bottom wall 25 of the base 21 and the bottom plate 71 of the support plate 310 leaving a space.

The attachment part 342 is provided with a through-hole 345. The through-hole 345 penetrates the attachment part 342 in substantially the Z direction. Therefore, the through-hole 345 is opened in the upper surface 342*a* and the lower surface 342*b*. The through-hole 345 may be a cutout opened at an edge of the attachment part 342.

For example, the adsorption unit 19 of the second embodiment is attached to the attachment part 342. Note that the adsorption unit 19 of the first embodiment may be attached to the attachment part 342. The upper surface 115*a* of the plate 115 is mounted on the lower surface 342*b* of the attachment part 342. In other words, the attachment member 340 supports the adsorbent 111 via the film 112.

The embracing part 211 penetrates the through-hole 345 so as to protrude from the upper surface 342*a* of the attachment part 342. In other words, the embracing part 211 is fitted in the through-hole 345. Furthermore, the embracing part 211 protrudes from the lower surface 342*b*.

In the HDD 10 of the third embodiment described above, the elastic member 331 is attached to one of the support plate 310 and the case 91. The adsorption unit 19 includes the attachment member 340 that is held between the other of the support plate 310 and the case 91 and the elastic member 331, to support the adsorbent 111. As such, the attachment member 340 can be held therebetween in the process of attaching the inner cover 22 to the base 21. This can facilitate the assembly of the HDD 10. Furthermore, the attachment member 340 is detachable from the support plate 310 and the case 91, therefore, it can be readily molded.

Fourth Embodiment

Figure 8:
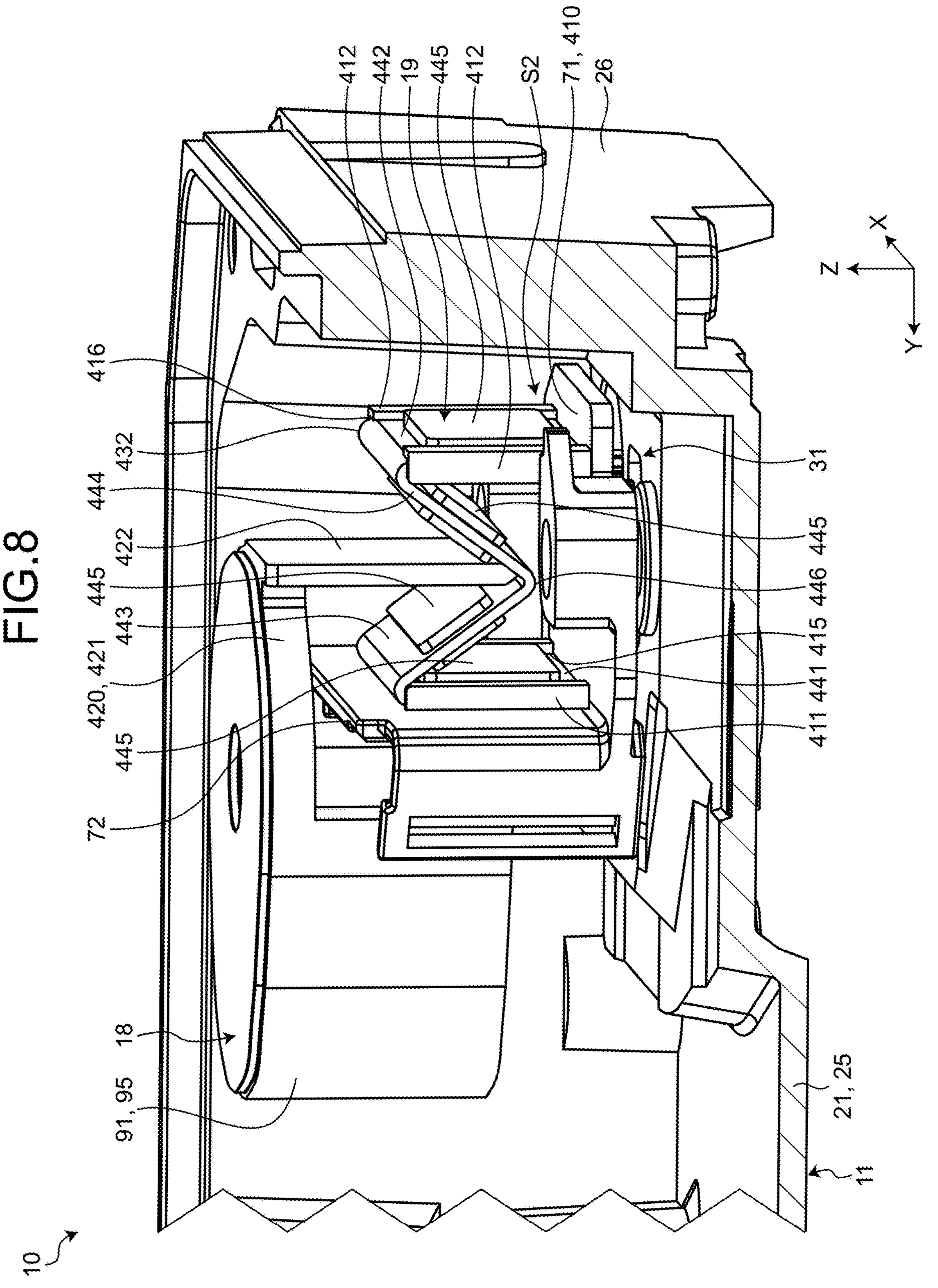
FIG. 8 is an exemplary perspective view of a part of an HDD according to a fourth embodiment.
Figure 9:
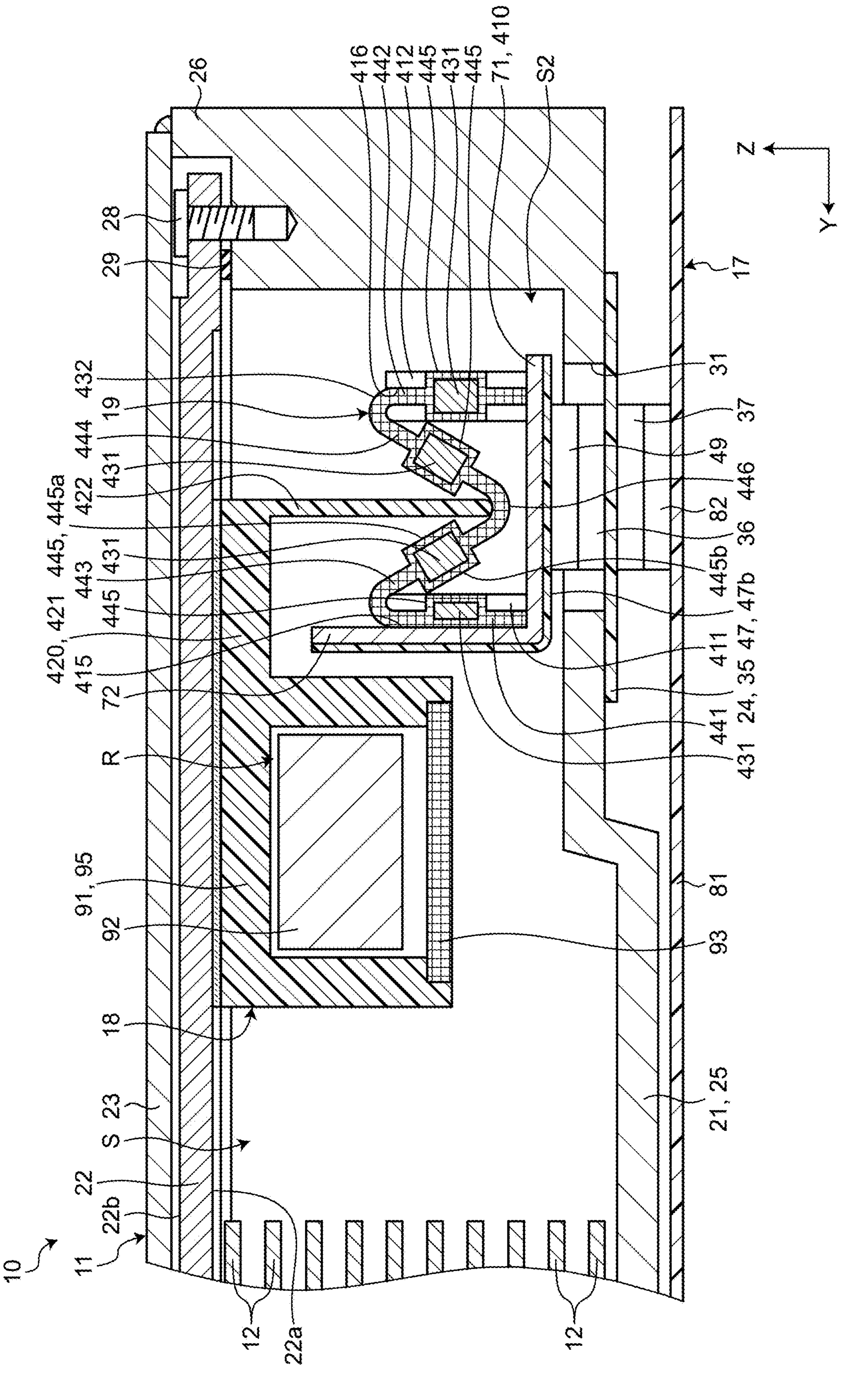
FIG. 9 is an exemplary cross-sectional view schematically illustrating a part of the HDD of the fourth embodiment.

Hereinafter, a fourth embodiment will be described with reference to FIGS. 8 and 9. FIG. 8 is an exemplary perspective view of a part of the HDD 10 according to the fourth embodiment. FIG. 9 is an exemplary cross-sectional view schematically illustrating a part of the HDD 10 of the fourth embodiment.

As illustrated in FIG. 8, the HSA 14 of the fourth embodiment includes a support plate 410 instead of the support plate 48. The support plate 410 is substantially equal to the support plate 48 except for the points described below. The support plate 410 is an example of a first member. The support plate 410 includes a pair of holding walls 411 and a pair of holding walls 412.

The holding walls 411 and the holding walls 412 protrude substantially in the +Z direction from the bottom plate 71. The pair of holding walls 411 are separated from each other in the X direction and connected to the standing plate 72. Each of the pair of holding walls 411 is provided with a slit 415 that extends substantially in the Z direction.

The pair of holding walls 412 are separated from each other in the X direction and are separated from the holding walls 411 in substantially the −Y direction. Each of the pair of holding walls 412 is provided with a slit 416 extending substantially in the Z direction. The slits 415 and 416 are opened in the +Z direction.

The case 91 of the fourth embodiment includes an attachment wall 420 instead of the attachment wall 96. The attachment wall 420 includes a transverse part 421 and a pressing part 422. The transverse part 421 extends substantially in the −Y direction from the storage 95. The transverse part 421 extends along the inner surface 22*a* of the inner cover 22, over the standing plate 72 of the support plate 410. The pressing part 422 protrudes substantially in the −Z direction from an end of the transverse part 421 in the −Y direction.

As illustrated in FIG. 9, the adsorption unit 19 of the fourth embodiment includes a plurality of adsorbents 431 and a film 432 instead of the adsorbent 111 and the film 112. The plurality of adsorbents 431 is an example of the adsorbent and a plurality of adsorbers. The adsorbent 431 and the film 432 are substantially equal to the adsorbent 111 and the film 112 except for the points described below.

In the present embodiment, the adsorption unit 19 includes four adsorbents 431. The four adsorbents 431 are separated from each other. Each of the four adsorbents 431 adsorbs the organic gas. The four adsorbents 431 may adsorb different types of gases.

The film 432 includes four plates 441, 442, 443, and 444 and four embracing parts 445. The plate 441 is an example of a first attachment part. The plate 442 is an example of a second attachment part. In the present embodiment, the plates 441 and 442 are provided at both ends of the adsorption unit 19. The plates 443 and 444 are positioned between the two plates 441 and 442. Note that the film 432 is not limited to this example.

As illustrated in FIG. 8, the plate 441 is fitted in the slits 415 of the pair of holding walls 411. For example, the plate 441 is inserted into the slits 415, from an end of each of the slits 415 opened in the +Z direction. Therefore, the plate 441 is mounted to the pair of holding walls 411 of the support plate 410.

The plate 442 is fitted in the slits 416 of the pair of holding walls 412. For example, the plate 442 is inserted into the slits 416 from an end of each of the slits 416 opened in the +Z direction. Thus, the plate 442 is mounted to the pair of holding walls 412 of the support plate 410.

The plate 443 has one end that is connected to an end of the plate 441 in the +Z direction. The plate 444 has one end that is connected to an end of the plate 442 in the +Z direction. The other end of the plate 443 and the other end of the plate 444 are connected to each other.

The four plates 441, 442, 443, and 444 are provided with the respective embracing parts 445. The four embracing parts 445 cover the corresponding adsorbents 431. As illustrated in FIG. 9, each of the embracing parts 445 has a first surface 445*a* and a second surface 445*b*.

The first surface 445*a* and the second surface 445*b* are opposite to each other. At least one of the first surface 445*a* and the second surface 445*b* is exposed to the internal space S. The adsorbent 431 adsorbs the organic gas through at least one of the first surface 445*a* and the second surface 445*b*, which is exposed.

Each of the embracing parts 445 protrudes from at least one surface of each of the plates 441, 442, 443, and 444. The embracing part 445 provided in the plate 441 is positioned between the pair of holding walls 411 in the X direction. The embracing part 445 provided in the plate 442 is positioned between the pair of holding walls 412 in the X direction.

The pressing part 422 of the attachment wall 420 abuts on the film 432 between the plate 443 and the plate 444. Therefore, the case 91 is an example of a second member. The film 432 further includes a bend 446. The bend 446 is positioned between the plate 441 and the plate 442, and is bendably pressed by the pressing part 422 of the case 91 between the two plates 443 and 444.

The pressing part 422 presses the bend 446 to generate tension in the film 432. Therefore, the adsorption unit 19 is held between the support plate 410 and the case 91 so that the four plates 441, 442, 443, and 444 each extend substantially straight.

In the HDD 10 of the fourth embodiment described above, the plurality of adsorbents 431 is disposed apart from each other and has a composition to adsorb the organic gas. In the adsorption unit 19, thus, the adsorbent 431 can have an increased surface area. Additionally, in the adsorption unit 19 the plurality of adsorbents 431 can be disposed at two or more locations where the adsorbents 431 are efficiently exposed to the airflow. As such, the adsorption unit 19 can allow the adsorbents 431 to adsorb a larger amount of the organic gas.

The adsorption unit 19 is held between the support plate 410 and the case 91. That is, the adsorption unit 19 is held therebetween in the process of attaching the inner cover 22 to the base 21. This can facilitate the assembly of the HDD 10.

The adsorption unit 19 includes the plate 441, the plate 442, and the bend 446. The plate 441 and the plate 442 are attached to the support plate 410. The bend 446 is bent between the plate 441 and the plate 442 by being pressed by the case 91. In other words, the case 91 can apply pressure and tension to the bend 446. This allows the adsorption unit 19 to be held in a desired shape in the process of attaching the inner cover 22 to the base 21.

Fifth Embodiment

Figure 10:
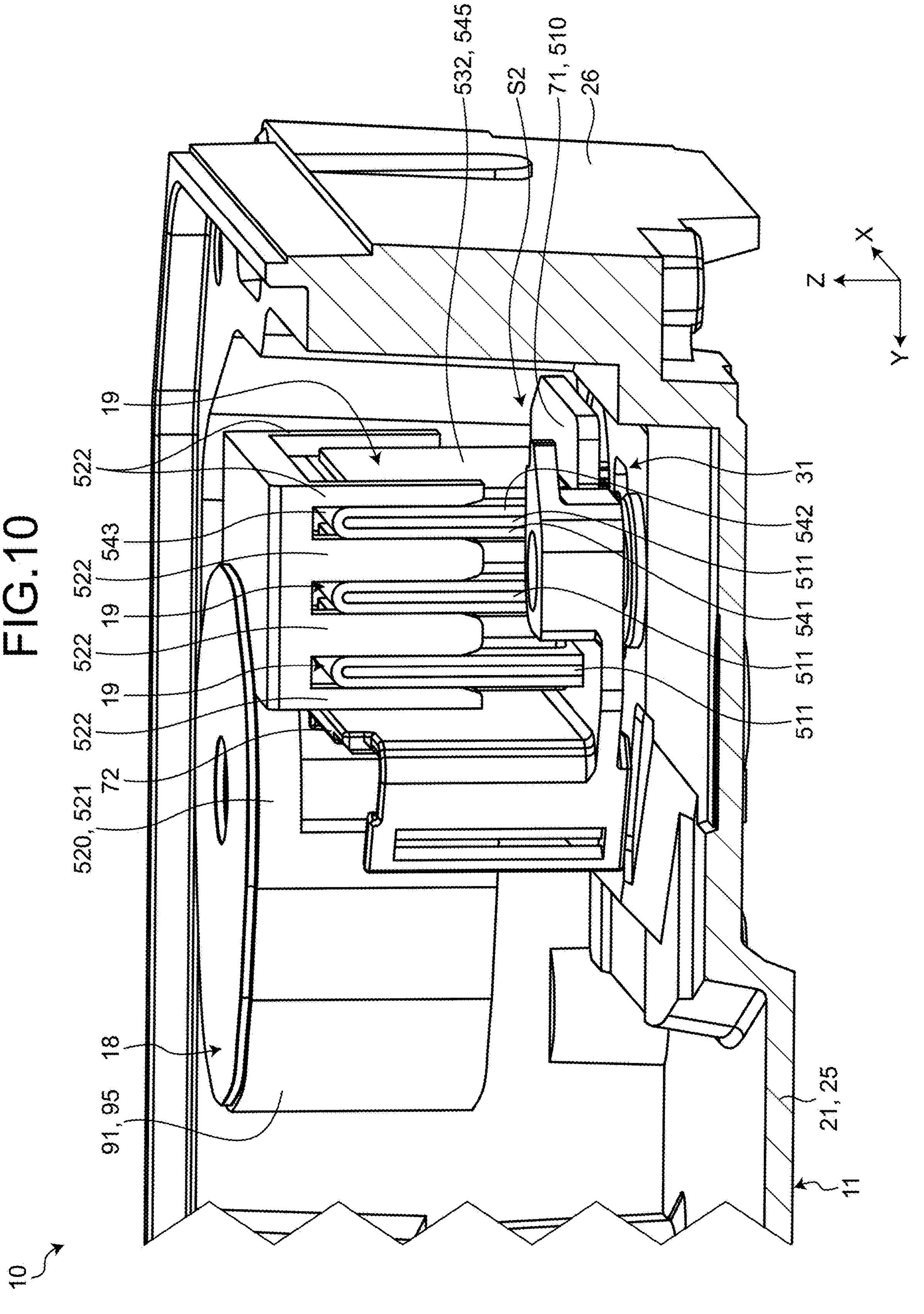
FIG. 10 is an exemplary perspective view of a part of an HDD according to a fifth embodiment.
Figure 11:
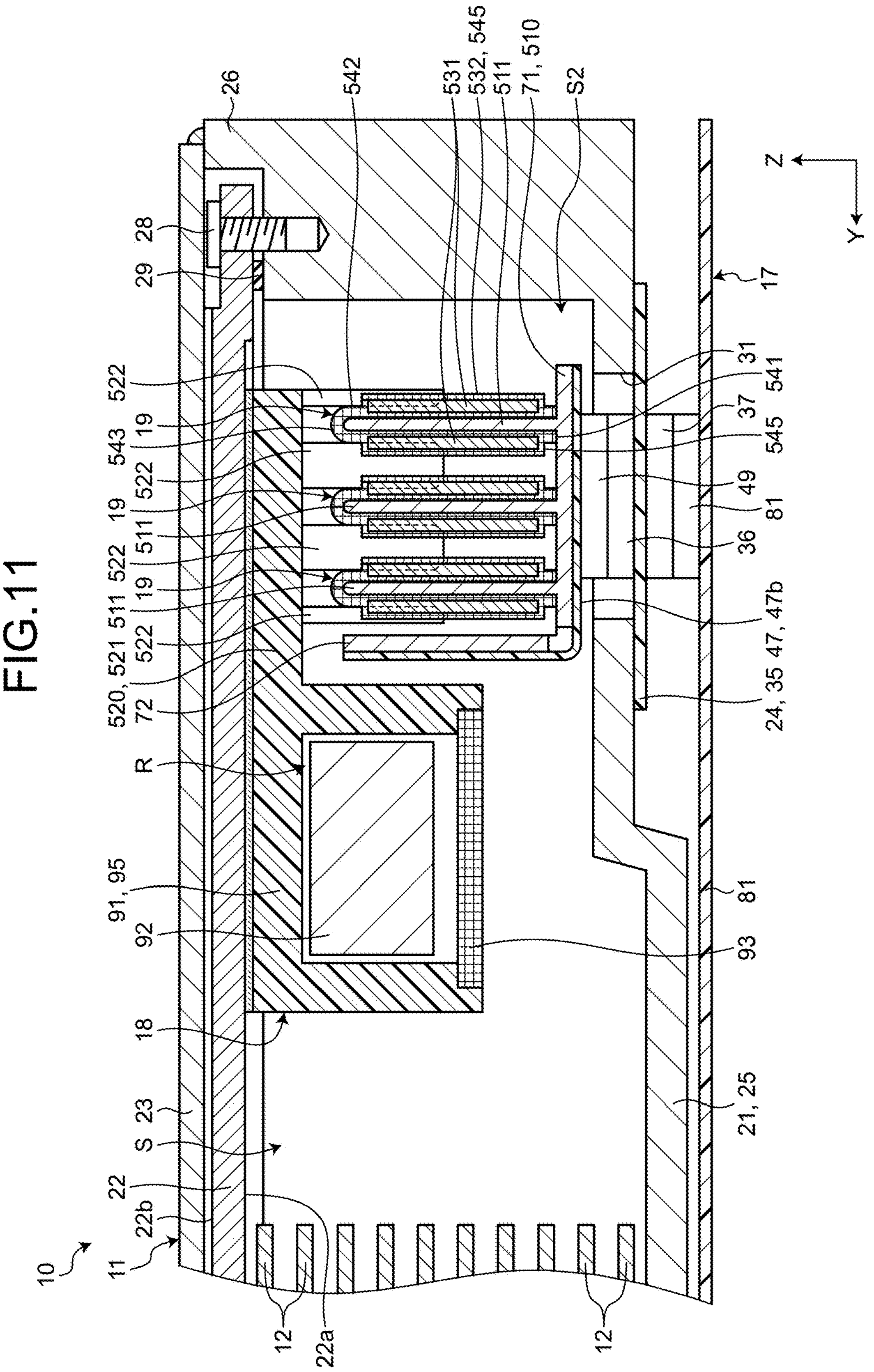
FIG. 11 is an exemplary cross-sectional view schematically illustrating a part of the HDD of the fifth embodiment.

Hereinafter, a fifth embodiment will be described with reference to FIGS. 10 and 11. FIG. 10 is an exemplary perspective view of a part of the HDD 10 according to the fifth embodiment. FIG. 11 is an exemplary cross-sectional view schematically illustrating a part of the HDD 10 of the fifth embodiment.

As illustrated in FIG. 10, the HSA 14 of the fifth embodiment includes a support plate 510 instead of the support plate 48. The support plate 510 is substantially equal to the support plate 48 except for the points described below. The support plate 510 includes three holding walls 511. The holding walls 511 are an example of a second holding wall. Therefore, the support plate 510 is an example of the second member.

The three holding walls 511 protrude substantially in the +Z direction from the bottom plate 71. The three holding walls 511 are arranged at intervals in the Y direction. The holding walls 511 are separated from the standing plate 72 in the −Y direction.

The case 91 of the fifth embodiment includes an attachment wall 520 instead of the attachment wall 96. The attachment wall 520 includes a transverse part 521 and a plurality of pairs of holding walls 522. The holding walls 522 are an example of a first holding wall. Therefore, the case 91 is an example of the first member.

The transverse part 521 extends substantially in the −Y direction from the storage 95. The transverse part 521 extends along the inner surface 22*a* of the inner cover 22 across the standing plate 72 of the support plate 510. The plurality of pairs of holding walls 522 extend substantially in the −Z direction from the transverse part 521. The plurality of pairs of holding walls 522 are arranged at intervals in the Y direction. Each of the three holding walls 511 stands between two adjacent holding walls 522 in the Y direction.

The HDD 10 of the fifth embodiment includes three adsorption units 19. As illustrated in FIG. 11, each of the three adsorption units 19 includes two adsorbents 531 and a film 532. The two adsorbents 531 are an example of the adsorbent and the plurality of adsorbers. The adsorbents 531 and the film 532 are substantially equal to the adsorbent 111 and the film 112 except for the points described below. The two adsorbents 531 are disposed with an interval to adsorb the organic gas.

The film 532 includes two plates 541 and 542, a bend 543, and two embracing parts 545. The plate 541 is an example of a first part. The plate 542 is an example of a second part. The bend 543 is an example of a third part.

The plate 541 is held between the holding wall 511 and one of the two adjacent holding walls 522 in the Y direction. The plate 542 is held between the holding wall 511 and the other of the two adjacent holding walls 522 in the Y direction. In this manner, the adsorption units 19 are held between the support plates 510 and the case 91. The holding wall 511 stands between the two plates 541 and 542. Furthermore, the two plates 541 and 542 stand between the two adjacent holding walls 522 in the Y direction.

The bend 543 connects an end of the plate 541 and an end of the plate 542 in the +Z direction. In other words, the bend 543 extends between the two plates 541 and 542. The bend 543 is bent along an end of the holding wall 511 in the +Z direction.

The embracing part 545 is provided in each of the two plates 541 and 542. The two embracing parts 545 cover the corresponding adsorbents 531. Each of the embracing parts 545 protrudes from one surface of each of the plates 541 and 542. In the X direction, the embracing parts 545 are positioned between a corresponding pair of holding walls 522.

Upon mounting the inner cover 22 to the base 21, the plurality of pairs of holding walls 522 move substantially parallel to the three holding walls 511, in substantially the Z direction. Therefore, each holding wall 511 is inserted into a gap between the two holding walls 522 adjacent in the Y direction, and holds the plates 541 and 542 of the adsorption unit 19 together with the two holding walls 522.

In the HDD 10 of the fifth embodiment described above, each adsorption unit 19 includes two holding walls 522. The support plate 510 includes the holding wall 511 in-between the two holding walls 522. Each adsorption unit 19 includes the plate 541, the plate 542, and the bend 543. The plate 541 is held between one of the two holding walls 522 and the holding wall 511. The plate 542 is held between the other of the two holding walls 522 and the holding wall 511. The bend 543 extends between the plate 541 and the plate 542. In other words, the adsorption unit 19 is bent at the bend 543 to allow the holding wall 511 to be placed between the plate 541 and the plate 542. At the time of attaching the inner cover 22 to the base 21, the adsorption unit 19 and the holding wall 511 are inserted in-between the two holding walls 522. In this manner, the adsorption unit 19 can be held in the process of attaching the inner cover 22 to the base 21. This can facilitate the assembly of the HDD 10.

Sixth Embodiment

Figure 12:
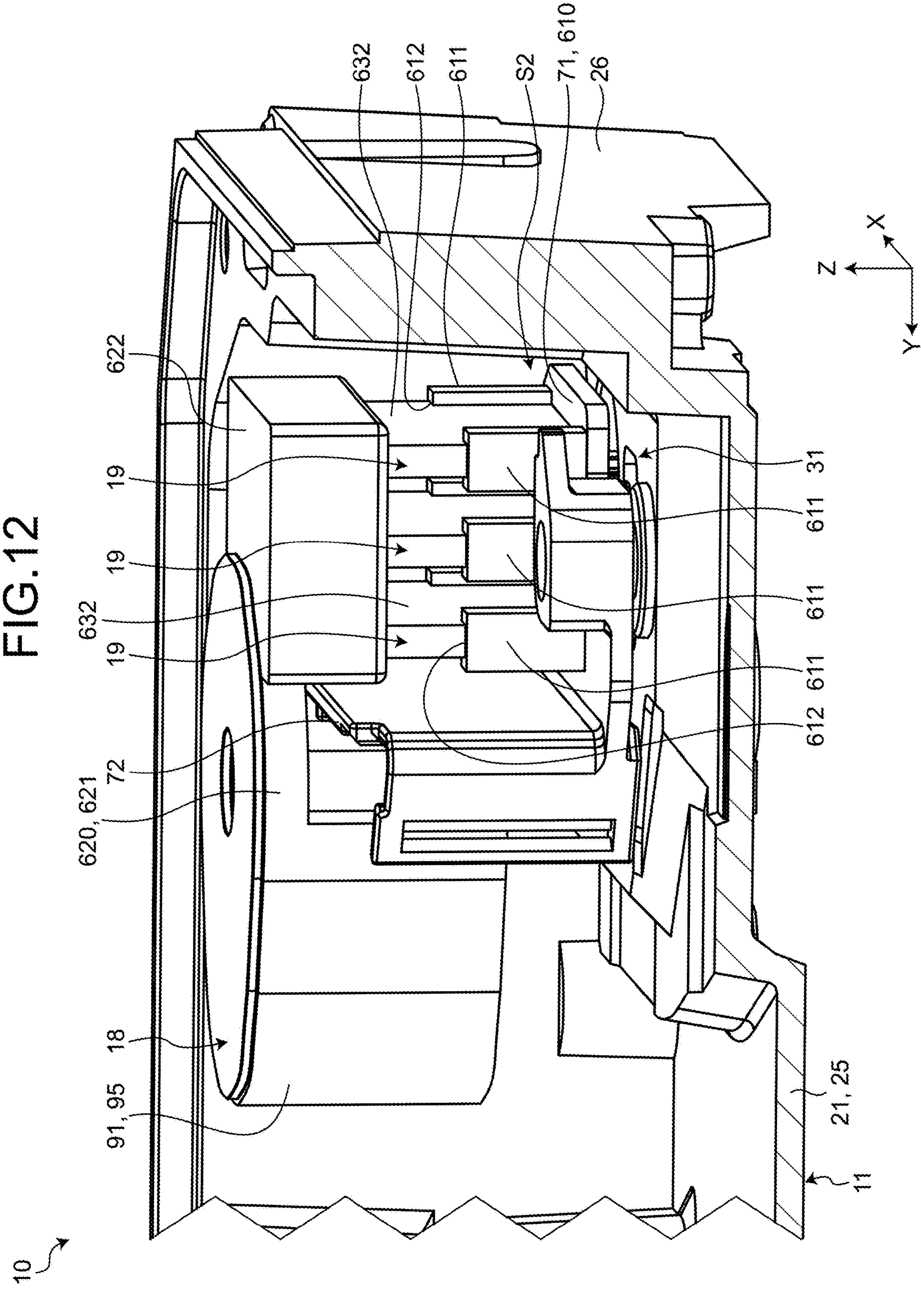
FIG. 12 is an exemplary perspective view of a part of an HDD according to a sixth embodiment.
Figure 13:
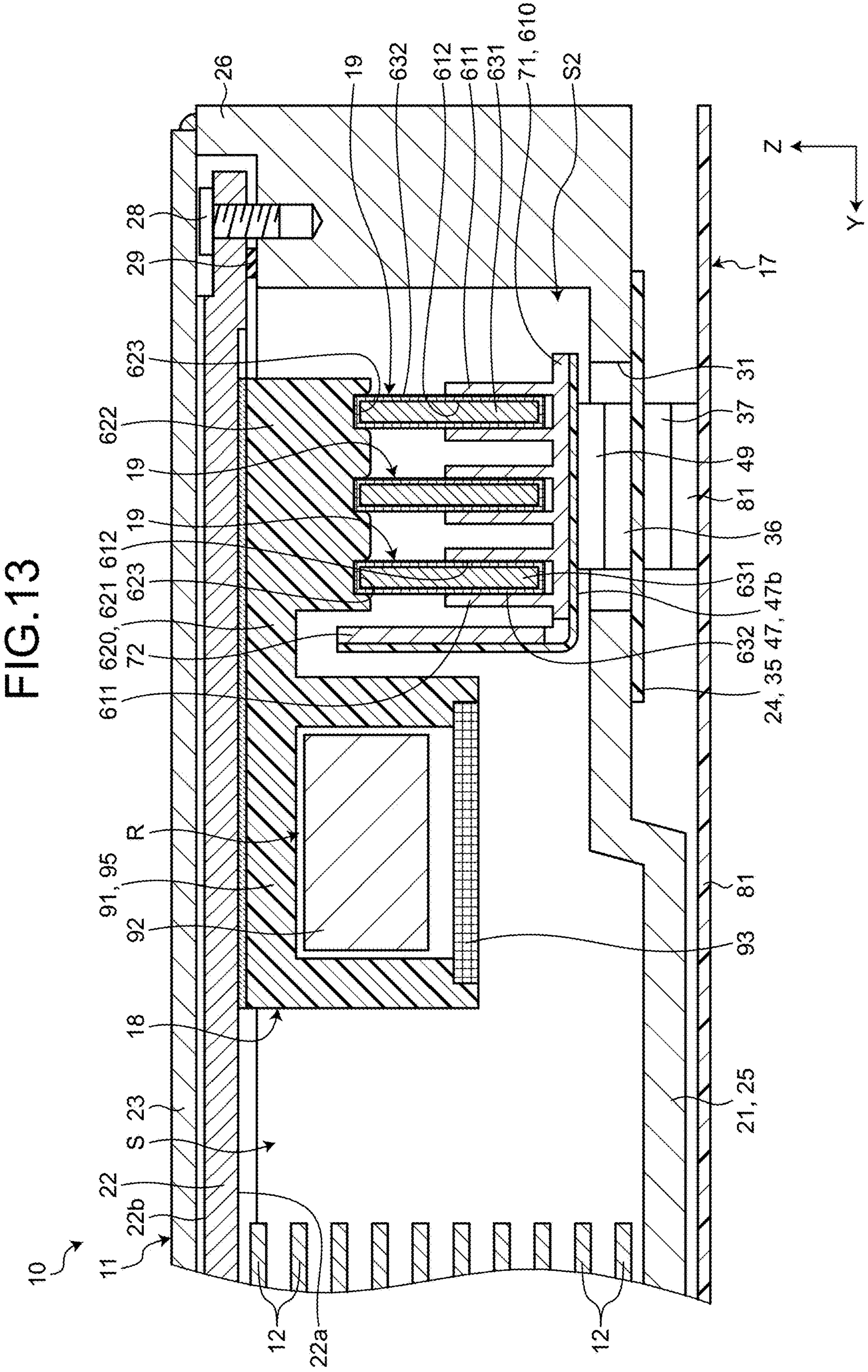
FIG. 13 is an exemplary cross-sectional view schematically illustrating a part of the HDD of the sixth embodiment.

Hereinafter, a sixth embodiment will be described with reference to FIGS. 12 and 13. FIG. 12 is an exemplary perspective view of a part of the HDD 10 according to the sixth embodiment. FIG. 13 is an exemplary cross-sectional view schematically illustrating a part of the HDD 10 of the sixth embodiment.

As illustrated in FIG. 12, the HSA 14 of the sixth embodiment includes a support plate 610 instead of the support plate 48. The support plate 610 is substantially equal to the support plate 48 except for the points described below. The support plate 610 has three pairs of holding walls 611.

The three pairs of holding walls 611 protrude substantially in the +Z direction from the bottom plate 71. The three pairs of holding walls 611 are arranged at intervals in the Y direction. The holding walls 611 are separated from the standing plate 72 in the −Y direction. Each of the holding walls 611 is provided with a slit 612 extending substantially in the Z direction. The slit 612 is opened in the +Z direction.

The case 91 of the sixth embodiment includes an attachment wall 620 instead of the attachment wall 96. The attachment wall 620 includes a transverse part 621 and a holding part 622. The transverse part 621 extends substantially in the −Y direction from the storage 95. The transverse part 621 extends along the inner surface 22*a* of the inner cover 22, over the standing plate 72 of the support plate 610. The holding part 622 is connected to an end of the transverse part 621 in the −Y direction.

As illustrated in FIG. 13, three slits 623 are provided in the holding part 622. The three slits 623 are arranged at intervals in the Y direction. Each of the slits 623 is opened in the −Z direction.

The HDD 10 of the sixth embodiment includes three adsorption units 19. Each of the three adsorption units 19 has an adsorbent 631 and a film 632. The adsorbents 631 of the three adsorption units 19 are an example of the adsorbent and the plurality of adsorbers. The adsorbent 631 and the film 632 are substantially equal to the adsorbent 111 and the film 112 except for the points described below.

The adsorbents 631 of the three adsorption units 19 are separated from each other and adsorb the organic gas. The film 632 wraps the adsorbent 631 into a substantially rectangular parallelepiped shape. In other words, in the sixth embodiment, each of the three adsorption units 19 has a substantially rectangular parallelepiped shape, and the film 632 does not include the plate. Note that the film 632 is not limited to this example.

The adsorption unit 19 has an end in the −Z direction that is fitted in the slits 612 of a corresponding pair of holding walls 611. For example, the adsorption unit 19 is inserted into the slits 612 from ends of the slits 612 opened in the +Z direction.

The adsorption unit 19 has an end in the +Z direction that is fitted in a corresponding slit 623 of the holding part 622. For example, the adsorption unit 19 is inserted into the slit 623 from an end of the slit 623 opened in the −Z direction. Therefore, the adsorption units 19 are held between the support plate 610 and the case 91.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:

a housing including a base with an internal space filled with a first gas, and a cover attached to the base, to close the internal space;

a holding member that is attached to the base in the internal space and holds a flexible printed circuit board;

a moisture absorption unit including a moisture absorbent having a composition to adsorb moisture, and a case that is attached to the cover in the internal space, and accommodates the moisture absorbent;

an adsorption unit including an adsorbent having a composition to adsorb a second gas different from the first gas, the adsorption unit being held by at least one of the holding member and the case outside the case in the internal space, and being exposed to the internal space; and a magnetic disk configured to rotate in the internal space, wherein the adsorption unit is further apart from the magnetic disk than the moisture absorbent, the holding member includes a first wall attached to the base and a second wall extending from the first wall toward the cover, and the adsorption unit is further apart from the magnetic disk than the second wall.

2. The disk device according to claim 1, wherein the adsorbent includes a plurality of adsorbers having a composition to adsorb the second gas and disposed apart from each other.

3. The disk device according to claim 1, further comprising:

an elastic member attached on one of the holding member and the case, wherein the adsorption unit includes a member that supports the adsorbent, the member being held between the other of the holding member and the case and the elastic member.

4. The disk device according to claim 1, wherein the adsorption unit is held between the holding member and the case.

5. The disk device according to claim 4, wherein one of the holding member and the case includes a first member, the other of the holding member and the case includes a second member, and the adsorption unit includes a first attachment part attached to the first member, a second attachment part attached to the first member, and a bend being bent between the first attachment part and the second attachment part by being pressed by the second member.

6. The disk device according to claim 4, wherein one of the holding member and the case includes a first member including two first holding walls, the other of the holding member and the case includes a second member including a second holding wall between the two first holding walls, and the adsorption unit includes a first part held between one of the two first holding walls and the second holding wall, a second part held between the other of the two first holding walls and the second holding wall, and a third part extending between the first part and the second part.

7. A disk device comprising:

a housing including a base with an internal space filled with a first gas, and a cover attached to the base, to close the internal space;

a holding member that is attached to the base in the internal space and holds a flexible printed circuit board;

a moisture absorption unit including a moisture absorbent having a composition to adsorb moisture, and a case that is attached to the cover in the internal space, and accommodates the moisture absorbent;

an adsorption unit including an adsorbent having a composition to adsorb a second gas different from the first gas, the adsorption unit being held by at least one of the holding member and the case outside the case in the internal space, and being exposed to the internal space; and a magnetic disk configured to rotate in the internal space, wherein the adsorption unit is further apart from the magnetic disk than the moisture absorbent, the internal space includes a first space in which the magnetic disk is disposed, a second space in which the adsorption unit is disposed, a first passage for allowing the first space to communicate with the second space, and a second passage for allowing the first space to communicate with the second space, the second passage being apart from the first passage.

8. A disk device comprising:

a housing including a base with an internal space filled with a first gas, and a cover attached to the base, to close the internal space;

a holding member that is attached to the base in the internal space and holds a flexible printed circuit board;

a moisture absorption unit including a moisture absorbent having a composition to adsorb moisture, and a case that is attached to the cover in the internal space, and accommodates the moisture absorbent;

an adsorption unit including an adsorbent having a composition to adsorb a second gas different from the first gas, the adsorption unit being held by at least one of the holding member and the case outside the case in the internal space, and being exposed to the internal space, wherein the adsorption unit includes a first surface exposed to the internal space, and a second surface being opposite to the first surface and exposed to the internal space, and the adsorbent has a composition to adsorb the second gas through the first surface and through the second surface.

9. The disk device according to claim 8, wherein the adsorption unit includes an air-permeable film that covers the adsorbent, and the first surface and the second surface are included in the film.

10. The disk device according to claim 9, wherein the adsorption unit is attached to the case.

11. The disk device according to claim 10, wherein the case includes a storage that stores the moisture absorbent, and an attachment wall with a through-hole, extending from the storage, the adsorption unit includes a third surface opposite to the first surface, and a protrusion protruding from the third surface, the first surface is attached to the attachment wall and exposed to the internal space through the through-hole, and the second surface is included in the protrusion.

12. The disk device according to claim 10, wherein the case includes a storage that stores the moisture absorbent, and an attachment wall extending from the storage, the attachment wall has a fourth surface, a fifth surface opposite to the fourth surface, and a through-hole opening to the fourth surface and the fifth surface, and the adsorption unit is fitted in the through-hole so as to protrude from the fourth surface and from the fifth surface.

* * * * *